United States Patent
Kanakubo

(10) Patent No.: US 7,843,587 B2
(45) Date of Patent: Nov. 30, 2010

(54) INFORMATION PROCESSING APPARATUS, PRINT CONTROL METHOD, STORING MEDIUM, AND PROGRAM

(75) Inventor: Yukio Kanakubo, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1038 days.

(21) Appl. No.: 11/560,976

(22) Filed: Nov. 17, 2006

(65) Prior Publication Data
US 2007/0127047 A1 Jun. 7, 2007

(30) Foreign Application Priority Data
Dec. 6, 2005 (JP) ............................. 2005-351484
Feb. 27, 2006 (JP) ............................. 2006-050298

(51) Int. Cl.
*G06F 3/12* (2006.01)
*G06K 1/00* (2006.01)

(52) U.S. Cl. .................. 358/1.15; 358/1.1; 358/1.4
(58) Field of Classification Search ................ 358/1.1, 358/1.9, 1.11–1.18, 1.4, 1.5
See application file for complete search history.

*Primary Examiner*—Thierry L Pham
(74) *Attorney, Agent, or Firm*—Cowan, Liebowitz & Latman, P.C.

(57) ABSTRACT

When a sheet remains in a staying portion of a printer for executing alternating sheet feed duplex printing, a printer driver precedently transfers print data of a page to the staying sheet to the printer in page order different from order of pages to be normally transmitted upon alternating sheet feed duplex printing. Thus, when two-sheet stay alternating feed is executed in the duplex printing without providing a memory of a large capacity, even if a no-sheet error occurred in a sheet feeding portion, the staying sheet can be preferentially printed and ejected.

20 Claims, 12 Drawing Sheets

FIG. 12

STORING MEDIUM SUCH
AS FD/CD-ROM, etc.

| DIRECTORY INFORMATION |
|---|
| 1ST DATA PROCESSING PROGRAM<br>PROGRAM CODE GROUP CORRESPONDING TO STEPS<br>IN FLOWCHART SHOWN IN FIG. 7 |
| 2ND DATA PROCESSING PROGRAM<br>PROGRAM CODE GROUP CORRESPONDING TO STEPS<br>IN FLOWCHART SHOWN IN FIG. 11 |

MEMORY MAP IN STORING MEDIUM

FIG. 13

STORING MEDIUM SUCH
AS FD/CD-ROM, etc.

| DIRECTORY INFORMATION |
|---|
| 1ST DATA PROCESSING PROGRAM<br>PROGRAM CODE GROUP CORRESPONDING TO STEPS<br>IN FLOWCHART SHOWN IN FIG. 8 |
| 2ND DATA PROCESSING PROGRAM<br>PROGRAM CODE GROUP CORRESPONDING TO STEPS<br>IN FLOWCHART SHOWN IN FIG. 10 |

MEMORY MAP IN STORING MEDIUM

INFORMATION PROCESSING APPARATUS, PRINT CONTROL METHOD, STORING MEDIUM, AND PROGRAM

BACKGROUND OF THE INVENTION

1. Field of the Invention

The invention relates to print control of an information processing apparatus for outputting print data based on application data to a printing apparatus.

2. Description of the Related Art

Hitherto, in copying apparatuses, a printing apparatus (hereinafter, also referred to as a printer) which can perform duplex printing by a two-sheet stay alternating feed has been proposed.

In such a copying apparatus, in the case of executing the duplex printing, it is necessary to execute what is called "sheet re-feed" in which after the first side was printed, a front edge and a rear edge of a sheet are reversed, and thereafter, the sheet is conveyed to a photosensitive drum until the printing of the second side is started. Since the printing cannot be executed for a period of time of such "sheet re-feed" in the duplex printing of a one-sheet stay, a print speed decreases.

As disclosed in Japanese Patent Application Laid-Open No. H06-015895 and Japanese Patent Application Laid-Open No. H10-003215, in the duplex printing by the two-sheet stay alternating feed, to solve such a problem, another sheet is printed by using the period of time during which the foregoing reversal and sheet re-feed are being executed, thereby preventing the decrease in the print speed.

To realize the duplex printing of the two-sheet stay alternating feed, in the copying apparatus, generally, by holding print data of a plurality of pages into a page memory of a large capacity, the print order is changed (in the normal printing, the printing is executed in order of pages such as 1, 2, 3, 4, 5, . . . ; however, in the case of the two-sheet stay alternating feed, the printing is executed in order of pages such as 2, 4, 1, 6, 3, 8, 5, 10, . . . ) or an error recovery is made by using the held print data in the case where an error occurred.

However, to execute the duplex printing by such a method, the memory of the capacity which can hold the print data of a plurality of pages has to be provided for the copying apparatus; unless otherwise, the error recovery cannot be made. To print at the highest print speed of a printer engine, a memory of a capacity which can hold the print data of four to eight pages is usually necessary.

A case where a "no-sheet error" occurred during the duplex printing by the two-sheet stay alternating feed will now be considered.

As also mentioned above, in the case of ejecting the sheets to a face-down tray in the duplex printing by the two-sheet stay alternating feed, the printing is executed in the following page order.

1B(2)→2B(4)→1A(1)→3B(6)→2A(3)→4B(8)→3A(5)→5B(10)→4A(7) . . .

where A indicates obverse side, B indicates reverse side, and ( ) indicates the number of pages.

Similarly, in the case of ejecting the sheets to a face-up tray, the printing is executed in the following page order.

1A(1)→2A(3)→1B(2)→3A(5)→2B(4)→4A(7)→3B(6)→5A(9)→4B(8) . . .

However, since there is such a difference that the order of the obverse and reverse sides of each sheet is merely exchanged between the case of ejecting the sheets to the face-down tray and the case of ejecting the sheets to the face-up tray, explanation will be made hereinbelow with respect to the case of ejecting the sheet to the face-down tray.

It is now assumed that three sheets have been set to a sheet feeding port. When the printing is executed, the printing can be executed up to 2A(3). However, since only three sheets have been set, the subsequent printing cannot be executed because the printing of 4B(8) uses the fourth sheet.

However, as for the third sheet, 3B(6) is printed and the sheet remains in the printing apparatus (in a duplex unit). If the apparatus waits until another sheet is set to the sheet feeding port in such a state, the sheets in the printer are dried and curled by the heat in the apparatus.

In the conventional copying apparatus, a technique in which 3A(5) is preferentially printed, thereby preventing the sheet from staying in the printer is also presumed in consideration of the above problem.

However, the conventional copying apparatus or the like as mentioned above has such a problem that since the memory of the large capacity is necessary to hold the print data, the costs rise.

Particularly, in a low-priced host-based print system, since bit map data is held as print data in the printer, a memory of a larger capacity is necessary and an increase in costs of the printer is further conspicuous.

SUMMARY OF THE INVENTION

Embodiments of the present invention are provided to overcome the above-described drawbacks of the related technology.

According to an aspect of the present invention, there is provided an information processing apparatus which can form print data based on application data and can communicate with a printing apparatus which can execute an alternating sheet feed constructed in such a manner that in advance of printing of the other side of a first medium whose one side has already been printed, a second medium is fed from a sheet feeding portion, one side of the second medium is printed, a conveying operation for duplex printing of the first medium is executed in parallel with the printing of one side of the second medium, and after completion of the printing of one side of the second medium, the first medium to which the conveying operation for the duplex printing has been executed is fed, thereby executing the duplex printing, comprising: first output means adapted to output the print data according to print page order based on the alternating sheet feed to the printing apparatus through an interface; first obtaining means adapted to obtain status information of the printing apparatus; second obtaining means adapted to obtain situation information of the printing based on the print data; and second output means adapted to output the print data of a non-print page in the staying medium which has already been fed and whose one side has already been printed to the printing apparatus in order to change the print page order based on the alternating sheet feed when a print fault factor to the medium to be newly fed is detected on the basis of the status information obtained by the first obtaining means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 12 is a diagram for explaining a memory map of a storing medium for storing various data processing programs which can be read by the printing apparatus according to the invention.

FIG. 13 is a diagram for explaining a memory map of a storing medium for storing various data processing programs which can be read by the information processing apparatus according to the invention.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Explanation of System Construction

First Embodiment

An embodiment of the invention will be described hereinbelow with reference to the drawings.

Prior to explaining a construction of the embodiment, a construction of a color laser beam printing apparatus (also referred to as a printer) to which the embodiment is applied will now be described with reference to FIG. 1.

Figure 1:
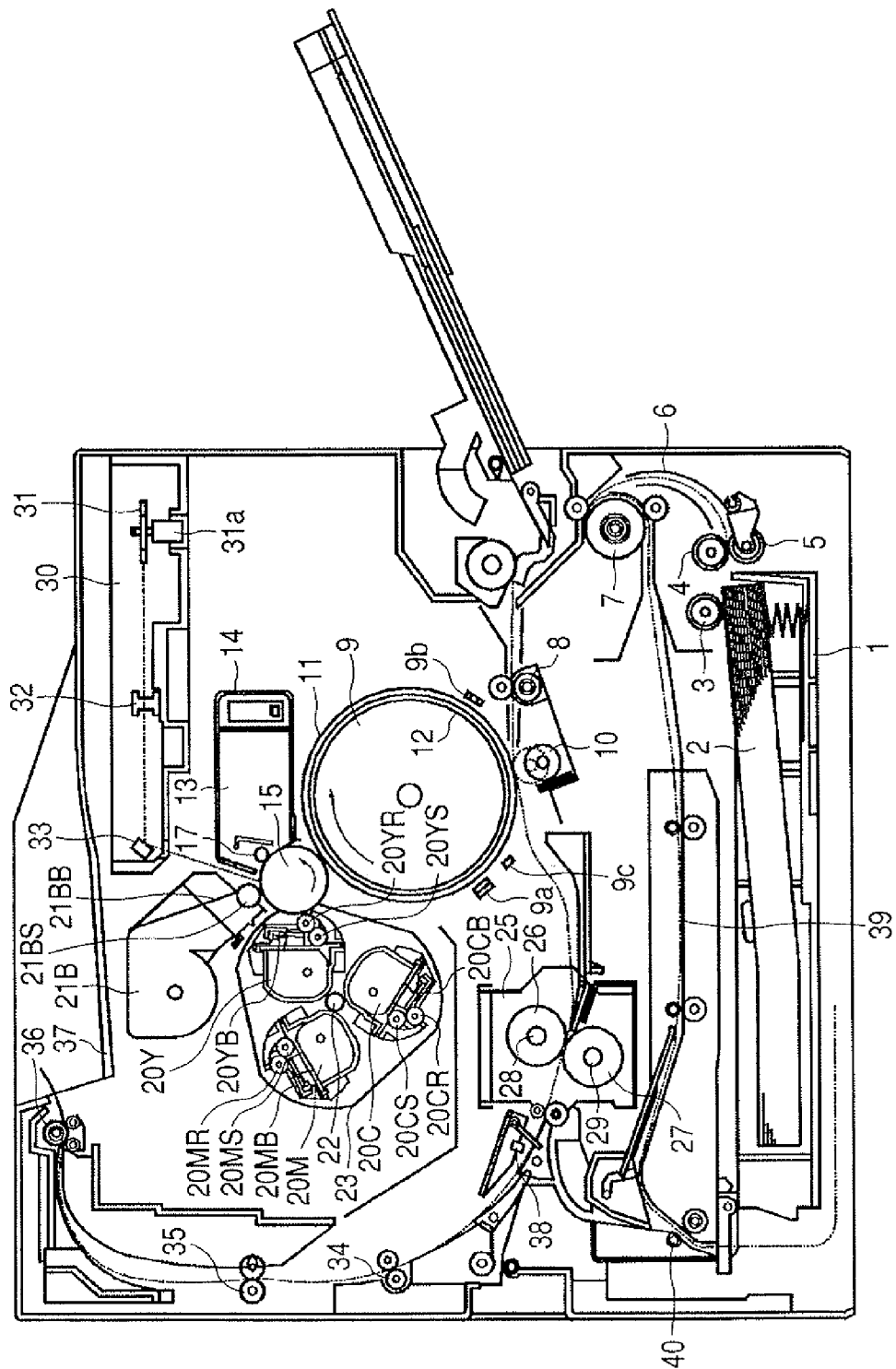
FIG. 1 is a cross sectional view for explaining a construction of a printing apparatus which can be applied to a print processing system according to the invention.

FIG. 1 is a cross sectional view for explaining the construction of the printing apparatus which can be applied to a print processing system according to the invention. The embodiment relates to an example of a color printing apparatus constructed in such a manner that a recording medium which is fed is wound around a transfer drum, further, a plurality of developing units arranged in close vicinity to a photosensitive drum are rotated, color images are developed on the photosensitive drum every color, and the developed images are multiple-transferred onto an intermediate transfer member 9 with respect to all colors, thereby forming a color visible image. A construction of a host apparatus side will be described in detail with reference to FIG. 2 and subsequent drawings.

As will be explained hereinafter, the printing apparatus has an alternating feeding mode which corresponds to a duplex printing mode using a staying portion and in which a sheet feed from a sheet feeding portion and a sheet feed from the staying portion are alternately performed by controlling a sheet ejecting path.

An image forming unit of the color laser printer is constructed by: an image holding member (photosensitive drum) 15 which is rotated at a predetermined speed; a fixed black developing unit 21B; and rotatable color developing units of three colors (yellow developing unit 20Y, magenta developing unit 20M, and cyan developing unit 20C).

The intermediate transfer member 9 for holding the color image which has been developed and multiple-transferred and further transferring the color image onto a transfer material 2 which has been fed from a feeding portion is arranged almost under the image forming unit.

The transfer material 2 to which the color image has been transferred is conveyed to a fixing unit 25 and fixed onto the transfer material 2 and, thereafter, the transfer material 2 is ejected to a delivery unit 37 in an upper portion of the printer by delivery rollers 34, 35, and 36.

The rotary developing units of three colors and the fixed black developing unit are constructed so as to be individually detachable for a printer main body.

Constructions of respective units (portions) of the image forming apparatus will now be sequentially explained in detail.

Image Holding Member Unit

In a drum unit 13 as an image holding member unit, the image holding member (photosensitive drum) 15 and a container 14 of a cleaning device also serving as a holder of the photosensitive drum 15 are integratedly constructed. The drum unit 13 is detachably supported to the printer main body and can be easily exchanged in accordance with a service life of the photosensitive drum 15.

The photosensitive drum 15 according to the embodiment is constructed in such a manner that an outer periphery of an aluminum cylinder having a diameter of 62 mm is coated with an organic photoconductive layer. The drum 15 is rotatably supported to the container 14 of the cleaning device as mentioned above.

A cleaner blade and primary charging means 17 are arranged on a periphery of the photosensitive drum 15. By transferring a driving force of a driving motor (not shown) to one end of the photosensitive drum 15, the drum 15 can be rotated counterclockwise in the diagram in accordance with the image forming operation.

Charging Means

The primary charging means 17 uses a contact charging method and is constructed in such a manner that a conductive roller is come into contact with the photosensitive drum 15 and a voltage is applied to the conductive roller, thereby uniformly charging the surface of the drum 15.

Exposing Means

Exposure to the photosensitive drum 15 is performed from a scanner unit 30. That is, when an image signal is supplied to a laser diode, the laser diode irradiates an image corresponding to the image signal onto a polygon mirror 31.

The polygon mirror 31 is rotated at a high speed by a scanner motor 31a. The image light reflected by the polygon mirror 31 passes through an image forming lens 32, is reflected by a reflecting mirror 33, and selectively exposes the surface of the photosensitive drum 15 which is rotating at a predetermined speed. Thus, an electrostatic latent image is formed on the photosensitive drum 15.

Developing Means

To visualize the electrostatic latent image, developing means is constructed by the three rotary developing units 20Y, 20M, and 20C and one black developing unit 21B which enable the color images of yellow, magenta, cyan, and black to be developed.

The black developing unit 21B is a fixed developing unit and constructed in such a manner that a developing sleeve 21BS is arranged at a position where it faces the photosensitive drum 15 at a micro interval (for example, about 300 μm) from the drum 15 and a visible image is formed onto the photosensitive drum 15 by using black toner.

The black developing unit 21B feeds the toner in the container to a toner supplying roller side by a feeding mechanism. An outer periphery of the developing sleeve 21BS which is rotated clockwise in the diagram is coated with the toner by a coating blade 21BB which has been come into pressure contact with the outer periphery of the developing sleeve 21BS, and charges are applied to the toner (frictional charging).

By applying a developing bias to the developing sleeve 21BS, a reversal development (jumping development) is executed in correspondence to the electrostatic latent image on the photosensitive drum 15 and the electrostatic latent image on the surface of the photosensitive drum 15 is visualized as a toner image.

A toner capacity of the black developing unit 21B is selected to an amount corresponding to 15000 pages (A4 size, 5% printing) which is twice or more times as large as a toner capacity of each of the rotary developing units 20Y, 20M, and 20C in consideration of documents and image patterns which are handled by the user and a toner consumption amount.

By increasing the capacity of the black developing unit as mentioned above, a frequency of exchange of the black developing unit by the user can be reduced and running costs per sheet of print can be also decreased.

As shown in FIG. 1, the black developing unit 21B is arranged at an intermediate position between the scanner unit 30 as an exposing apparatus and each of the rotary developing units 20Y, 20M, and 20C. By this layout, it is prevented that the toner which leaks when each of the rotary developing units 20Y, 20M, and 20C rotates is scattered to optical parts such as a laser scanner and the like. It is, consequently, prevented that the toner is deposited onto the polygon mirror, lens, mirror, or the like and obstructs the creation of the latent image. Thus, a clear output can be obtained.

Each of the three rotary developing units 20Y, 20M, and 20C contains toner of an amount corresponding to 6000 pages (A4 size, 5% printing) and is detachably held to a developing rotary 23 which is rotated around an axis 22 as a rotational center.

When an image is formed, each developing unit is rotated around the axis 22 as a rotational center and moved in the state where it is held to the developing rotary 23. When a predetermined one of the developing units is stopped at the position where it faces the photosensitive drum 15 and, further, the developing sleeve is positioned so as to face the photosensitive drum 15 at a micro interval (for example, about 300 μm), thereafter, the visible image is formed in correspondence to the electrostatic latent image on the photosensitive drum 15.

When a color image is formed, the developing rotary 23 is rotated every rotation of the intermediate transfer member 9 and the developing step is executed in order of the yellow developing unit 20Y, magenta developing unit 20M, cyan developing unit 20C, and black developing unit 21B.

For example, when the yellow developing unit 20Y executes the developing step, the yellow developing unit 20Y is positioned and comes to rest in the position where it faces the drum unit 13, and the toner in the container is supplied to a coating roller 20YR by the feeding mechanism. The outer periphery of a developing sleeve 20YS which is rotated clockwise in the diagram is coated with the toner as a thin layer by the coating roller 20YR which is rotated clockwise in the diagram and a coating blade 20YB which has been come into pressure contact with the outer periphery of the developing sleeve 20YS, and the charges are applied to the toner (frictional charging).

By applying a developing bias to the developing sleeve 20YS which faces the photosensitive drum 15 on which the electrostatic latent image has been formed, the toner development is performed onto the photosensitive drum 15 in accordance with the latent image.

With respect to each of the magenta developing unit 20M and the cyan developing unit 20C, the toner development is also performed by a mechanism similar to that mentioned above.

When each developing unit is rotated and moved to the developing position, the developing sleeve of each of the rotary developing units 20Y, 20M, and 20C is connected to each high-voltage power source for development and driving motors which are provided for the printer main body. Voltages are sequentially and selectively applied to the developing units every color development and the driving force is transferred.

Sleeves 20YS, 20MS, 20CS, and 21BS are provided for the color developing units 20Y, 20M, and 20C and the black developing unit 21B, respectively. Coating blades 20YB, 20MB, 20CB, and 21BB which are come into pressure contact with the outer peripheries of the sleeves 20YS, 20MS, 20CS, and 21BS are provided, respectively. Coating rollers 20YR, 20MR, and 20CR are provided for the three color developing units 20Y, 20M, and 20C, respectively.

Intermediate Transfer Member

The intermediate transfer member 9 is constructed so as to be come into contact with the photosensitive drum 15 and rotated in association with the rotation of the photosensitive drum 15. When the color image is formed, the intermediate transfer member 9 is rotated clockwise and subjected to the multiple-transfer of the visible images of four times from the photosensitive drum 15. When the image is formed, a transfer roller 10, which will be explained hereinafter, is come into contact with the intermediate transfer member 9 and sandwiches and conveys the transfer material 2, thereby simultaneously multiple-transferring the visible color images on the intermediate transfer member 9 onto the transfer material 2. A TOP sensor 9a and an RS sensor 9b for detecting the position regarding the rotating direction of the intermediate transfer member 9 and a concentration sensor 9c for detecting concentration of the toner image transferred onto the intermediate transfer member are arranged in an outer peripheral portion of the intermediate transfer member.

The transfer roller 10 has a transfer charging unit supported so that it can be come into contact with and removed from the photosensitive drum 15. The transfer roller 10 is formed by winding a foaming elastic member having a middle resistance around a metal axis.

That is, in the color image forming operation, since the toner images on the photosensitive drum 15 which have been visualized by the developing units are multiple-transferred onto the intermediate transfer member 9 four times (corresponding to the images of four colors of Y, M, C, and B), the intermediate transfer member 9 is rotated clockwise in the diagram synchronously with an outer peripheral speed of the photosensitive drum 15. The intermediate transfer member 9 subjected to the multiple-transfer sandwiches and conveys the transfer material 2 together with the transfer roller 10 to which the voltage has been applied and conveys it, thereby simultaneously multiple-transferring the color toner images on the intermediate transfer member 9 onto the transfer material 2.

The intermediate transfer member 9 according to the embodiment is constructed in such a manner that an outer periphery of an aluminum cylinder 12 having a diameter of 186 mm is coated with an elastic layer 11 such as sponge of a middle resistance, rubber of a middle resistance, or the like. The intermediate transfer member 9 is rotatably supported, driven by a gear (not shown) which has integratedly been fixed, and rotated.

Cleaning Means

After the toner visualized onto the photosensitive drum 15 by the developing means was transferred onto the intermediate transfer member 9, the cleaning means cleans the toner remaining on the photosensitive drum 15.

After that, the cleaned drain toner is accumulated into the container 14. As for an amount of drain toner which is accumulated into the container 14, the container 14 is not filled with the drain toner earlier than the life of the image holding member. Therefore, the container 14 is integratedly exchanged simultaneously with the exchange of the photosensitive drum 15 due to the expiration of the life.

Sheet Feeding Unit

The sheet feeding unit feeds the transfer material 2 to the image forming unit and is mainly constructed by: a cassette 1 in which a plurality of transfer materials 2 have been enclosed; feed rollers 3 and 4; a retarding roller 5 to prevent the overlap feeding; a feed guide 6; and a resist roller 8.

When the image is formed, the feed roller 3 is rotated in accordance with the image forming operation and separates and feeds the transfer materials 2 in the cassette 1 one by one. The fed transfer material is guided by the plate-shaped feed guide 6 and reaches the resist roller 8 through a conveying roller 7.

During the image forming operation, the resist roller 8 executes the non-rotating operation for setting the transfer material 2 into a stationary standby mode and the rotating operation for conveying the transfer material 2 toward the intermediate transfer member 9 in accordance with a predetermined sequence, thereby making the positions of the image and the transfer material 2 in a transfer step as a next step coincident.

Transfer Unit

The transfer unit is constructed by the transfer roller 10 which can swing. The transfer roller 10 is formed by winding the foaming elastic member of the middle resistance around the metal axis. The transfer roller 10 can be moved vertically in the diagram and has a driving motor.

While the toner images of four colors are being formed onto the intermediate transfer member 9, that is, while the intermediate transfer member 9 is rotated a plurality of number of times, the transfer roller 10 is located at a downward position shown by a solid line in the diagram and is away from the intermediate transfer member 9 so as not to disturb the images.

After the toner images of four colors were formed onto the intermediate transfer member 9, the transfer roller 10 is located at an upper position shown by a thin line in the diagram by a cam member (not shown) in accordance with the timing for transferring the color image onto the transfer material 2 and is pressed to the intermediate transfer member 9 with a predetermined pressure through the transfer material 2. At the same time, a bias is applied to the transfer roller 10 and the toner images on the intermediate transfer member 9 are transferred to the transfer material 2.

Since the intermediate transfer member 9 and the transfer roller 10 are driven, respectively, the transfer material 2 sandwiched between them is conveyed to the left in the diagram at a predetermined speed simultaneously with the execution of the transfer step and sent toward the fixing unit 25 for executing the next processing step.

Fixing Unit

The toner images formed by developing means are transferred onto the transfer material 2 through the intermediate transfer member 9. The fixing unit 25 fixes the toner images formed on the transfer material 2.

As shown in FIG. 1, the fixing unit 25 is constructed by: a fixing roller 26 for applying the heat to the transfer material 2; and a pressing roller 27 for allowing the transfer material 2 to be come into pressure contact with the fixing roller 26. The rollers 26 and 27 are hollow rollers and have heaters 28 and 29 therein, respectively. When the rollers 26 and 27 are rotated, they simultaneously convey the transfer material 2.

That is, the transfer material 2 holding the toner images is conveyed by the fixing roller 26 and the pressing roller 27 and, at the same time, since the heat and pressure are applied to the transfer material 2, the toner is fixed on the transfer material 2.

The transfer material (recording medium) 2 to be printed is taken out of the cassette 1 by the feed roller 3 and conveyed in the state where it is sandwiched between the intermediate transfer member 9 and the transfer roller 10. The color toner image is recorded onto the transfer material 2. The transfer material passes through the fixing unit 25 and the toner image is fixed. In the case of the simplex printing, a conveying path is formed so that a guide 38 guides the recording sheet to an upper sheet ejecting portion. In the duplex printing, a conveying path is formed so that the guide 38 guides the recording sheet to a lower duplex unit. In the embodiment, although an OHP sheet or the like other than paper can be applied as a recording medium, it is assumed that explanation will be made hereinbelow with respect to an example in which the paper is used as a representative one of the recording media.

Duplex Unit

The recording sheet guided to the duplex unit by the operation of the guide 38 is temporarily sent to a lower portion (conveying path shown by an alternate long and two short dashes line) of the cassette 1 by a conveying roller 40, thereafter, conveyed in the opposite direction, and sent to a duplex tray 39. On the duplex tray 39, the obverse/reverse state of the sheet is opposite to that of the sheet put on the cassette 1 and the front/rear sides of the sheet in the conveying direction is also opposite to that of the sheet put on the cassette 1. By executing again the transfer and fixing of the toner image in this state, the duplex printing can be executed.

In the embodiment, the printing apparatus has a duplex printing mode using the duplex tray 39 which functions as a staying portion when a CUP 1012 controls the guide 38, that is, an alternating feeding mode for alternately executing the sheet feed from the sheet feeding portion and the sheet feed from the duplex tray 39. The duplex tray 39 is not necessarily indispensable.

It is sufficient that the staying portion has a function for performing a temporary refuge and a sheet reversal of the sheet whose one side has already been printed in order to print (image creation) a certain side (obverse or reverse) of another sheet. In other words, even if the duplex tray 39 is not used, the duplex unit can be constructed.

Figure 2:
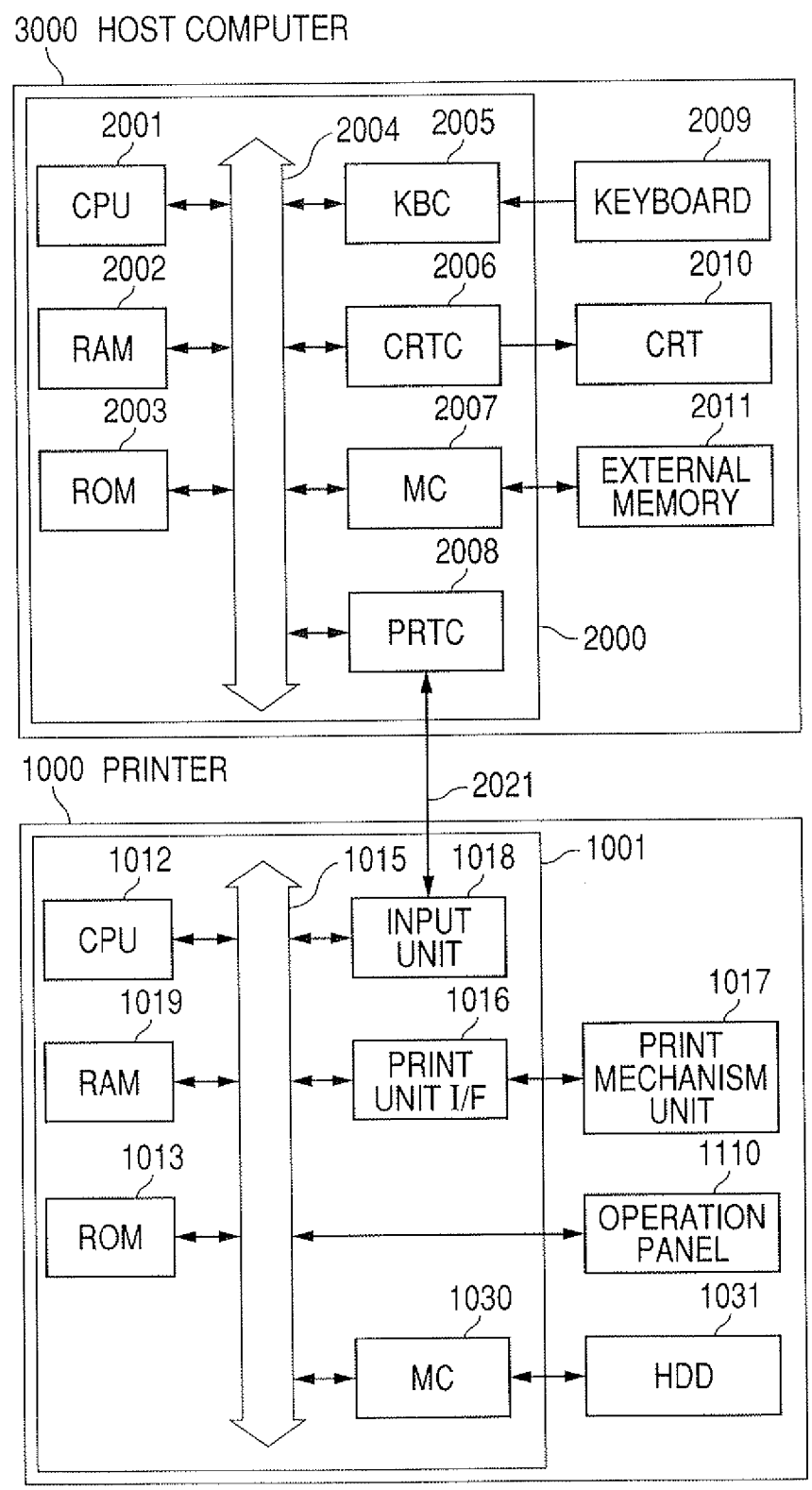
FIG. 2 is a block diagram for explaining a construction of a print system shown as an example in the first embodiment of the invention.

FIG. 2 is a block diagram for explaining a construction of the print system showing the first embodiment of the invention.

FIG. 2 is the block diagram for explaining a construction of a printing apparatus (printer) control system showing the embodiment of the invention. The color laser beam printer (FIG. 1) will now be described as an example here. The system may be a single apparatus or a system comprising a plurality of apparatuses so long as the functions of the invention are executed.

Naturally, the invention can be also applied to a system in which the processes are executed through a network such as a LAN or the like.

In the diagram, reference numeral 3000 denotes a host computer having a CPU 2001 for executing processes of a document in which a figure, an image, characters, a table (including a spreadsheet or the like), and the like exist mixedly on the basis of a document processing program or the like stored in a program ROM in a ROM 2003. The CPU 2001 collectively controls devices connected to a system bus 2004.

A control program and the like of the CPU 2001 as shown in flowcharts of FIGS. 7 and 8, which will be explained hereinafter, are stored in the program ROM in the ROM 2003.

Further, font data and the like which are used in the foregoing document process are stored in a font ROM in the ROM 2003. Various kinds of data which are used when the foregoing document process or the like is executed are stored in a data ROM in the ROM 2003.

Reference numeral 2002 denotes a RAM whose memory capacity can be expanded. The RAM 2002 functions as a main memory, a work area, and the like of the CPU 2001. Reference numeral 2005 denotes a keyboard controller (KBC) for controlling a key input from a keyboard 2009 or a pointing device (not shown).

Reference numeral 2006 denotes a CRT controller (CRTC) for controlling the display of a CRT display (CRT) 2010. Reference numeral 2007 denotes a memory controller (MC) for controlling an access to an external memory 2011 such as hard disk (HD), flexible disk (FD), or the like for storing the following information. The "information" mentioned here includes a boot program, various applications, font data, a user file, an edition file, and the like.

Reference numeral 2008 denotes a printer controller (PRTC) which is connected to a printing apparatus (printer) 1000 through a predetermined bidirectional interface (also simply referred to as an interface; I/F) 2021 and executes a process for controlling communication with a printer controller unit 1001. Transmission control of the print data to the printer and reception control of various kinds of data from the printer are made by the printer controller 2008.

The CPU 2001 executes, for example, a developing (rasterizing) process of an outline font into a display information RAM set in the RAM 2002, thereby enabling "WYSIWYG" on the CRT 2010. The CPU 2001 opens various registered windows on the basis of commands instructed by a mouse cursor or the like (not shown) on the CRT 2010 and executes various data processes.

In the printer 1000, reference numeral 1012 denotes the printer CPU (also referred to as a CPU) for collectively controlling an access to various devices connected to a system bus 1015 on the basis of the control program or the like stored in a program ROM in a ROM 1013. The CPU 1012 outputs an image signal as output information to a print unit (printer engine) 1017 connected through a print unit interface (I/F) 1016.

The CPU 1012 can execute a communicating process with the host computer through an input unit 1018 and can notify the host computer 3000 of information or the like in the printer.

Reference numeral 1019 denotes a RAM which functions as a main memory, a work area, or the like of the CPU 1012. A memory capacity of the RAM 1019 can be expanded by an option RAM which is connected to an expansion port (not shown).

The RAM 1019 functions as a drawing memory for storing image data (print data) received from the host computer 3000 through the bidirectional interface 2021 and the input unit 1018. The RAM 1019 is also used as an area for storing ON/OFF information of a video signal, another work area, and the like.

Reference numeral 1110 denotes an operation panel on which switches for the operation, an LED display, and the like are arranged. Reference numeral 1030 denotes a memory controller (MC) for controlling an access to a hard disk (HDD) 1031 for storing bit map data and the like received from the host computer 3000.

Reference numeral 1017 denotes the print mechanism unit corresponding to the image forming unit (comprising a group of devices for executing an electrophotographic process) shown in FIG. 1.

The host computer 3000 and the printer 1000 can be also constructed in such a manner that they can communicate through a network controller (NIC) provided for each of them in place of the bidirectional interface 2021.

Reference numerals 1001 and 2000 denote control units.

In the printer 1000 having the construction as mentioned above, the processing operation by the control units in the embodiment will now be described.

Figure 3:
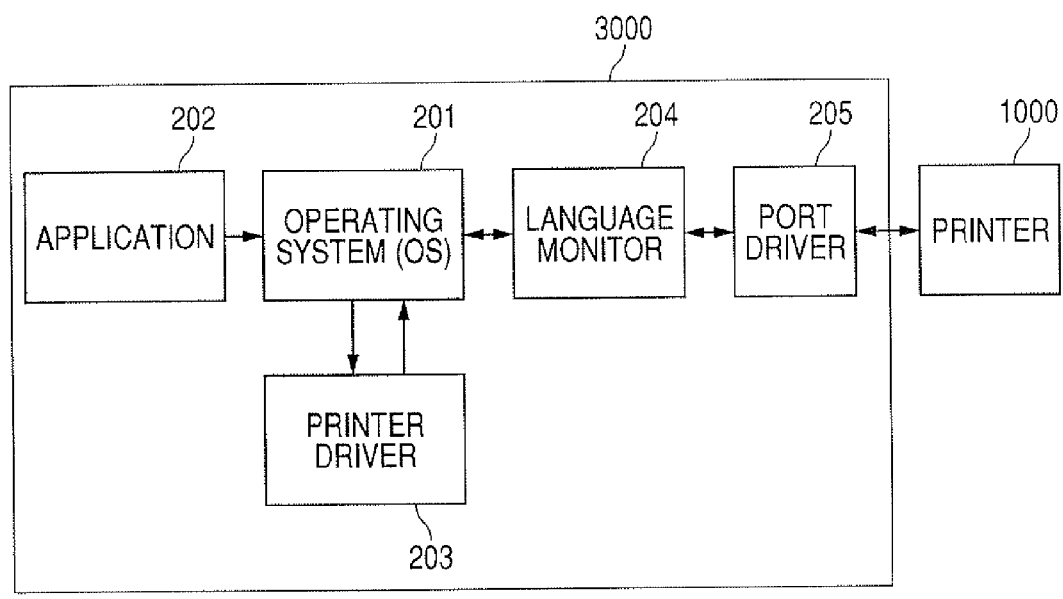
FIG. 3 is a block diagram for explaining an example of a construction of software modules of a host computer shown in FIG. 2.

FIG. 3 is a block diagram for explaining a construction of software modules of the host computer 3000 shown in FIG. 2. The same component elements as those in FIG. 2 are designated by the same reference numerals.

In FIG. 3, reference numeral 3000 denotes the host computer which has already been described in FIG. 2.

Reference numeral 201 denotes an operating system (OS) for controlling the hardware (refer to FIG. 2) provided for the host computer 3000. The OS 201 manages software such as application 202, printer driver 203, language monitor 204, port driver 205, and the like stored in the external memory 2011 shown in FIG. 2.

The application 202 is software such as a word processor and executes the creation, printing, and the like of a document in accordance with instructions of the operator. The application 202 is loaded into the RAM 2002 from the external memory 2011 and executed. The print data based on the data formed by the application 202 is formed by the printer driver 203, which will be explained hereinafter.

Reference numeral 203 denotes the printer driver for receiving a print instruction issued by the application 202 through the OS 201. The printer driver 203 converts the print instruction into a printer command which can be interpreted by the language monitor 204 and the printer 1000.

Reference numeral 204 denotes the language monitor for receiving the printer command outputted by the printer driver 203 and transmitting it to the printer 1000 through the port driver 205.

The language monitor 204 also has a function of obtaining the status information (various statuses) of the printer and print progress situation information in the printer from the printer 1000. Various kinds of information are presumed as status information of the printer. For example, a no-sheet error indicative of the absence of sheets of a specific size, a small remaining toner amount, a sheet jam, and the like can be mentioned. The language monitor 204 also has a function of obtaining the situation information of the printing in the printer. For example, print completion page information can be mentioned as situation information of the printing. Details of the print completion page information will be explained hereinafter.

It is now assumed that the operation in which "the language monitor transmits the data to the printer" denotes that it outputs the data to the port driver 205 in order to transmit the print data to the printer.

Reference numeral 205 denotes the port driver for transmitting the printer command outputted by the language monitor 204 to the printer 1000 through the bidirectional I/F 2021 such as a USB interface or the like. If the status is received from the printer 1000, the port driver 205 outputs it to the language monitor 204.

The printer 1000 executes the printing in accordance with the printer command received from the port driver 205.

The invention can be also applied to the case where the language monitor 204 and the port driver 205 are provided as functions of the printer driver.

A processing example in the alternating feeding mode for alternately executing the sheet feed from the sheet feeding portion and the sheet feed from the duplex unit in the information processing apparatus in the embodiment will be described hereinbelow.

The host computer 3000 transfers the print data of each page which is formed to the printer 1000 through a predetermined interface (in the embodiment, bidirectional I/F 2021).

The host computer 3000 has a storing unit which functions as a page memory for holding the print data of a few pages in the print data to be transferred to the printer 1000. The RAM 2002, a hard disk (not shown), or the like can be used as a storing unit.

The printing apparatus has the duplex printing mode using the duplex unit, that is, the alternating feeding mode for alternately executing the sheet feed from the cassette 1 as a sheet feeding portion and the sheet feed from the duplex unit (for example, duplex tray 39). The host computer 3000 also has a transmitting function in which when the duplex printing in the alternating feeding mode is executed, the print data is read out of the RAM 2002 and transmitted to the printer 1000 in page order in which the duplex serial page numbers of the sheets to be ejected are aligned. This function is executed through the language monitor 204 and the port driver 205 shown in FIG. 3.

The host computer 3000 also has a function in which the status information is obtained from the printer 1000 by the bidirectional communication, and when the sheets are staying in the duplex unit and a new sheet is fed from the cassette 1, whether or not a print fault factor (for example, no-sheet) has occurred is discriminated. Specifically speaking, such a discriminating process is made in step S27 in a processing loop S21 to S35 shown in FIG. 8, which will be explained hereinafter.

There is a case where it is determined by the above discriminating function that it is necessary to supply the sheets to the cassette 1, the print fault factor has occurred, and the printer has been shifted to the standby mode. In such a case, the transmitting function controls page transfer order of the print data in page order different from the page order of the print data to be transmitted in the normal alternating feeding mode. That is, the transmitting function controls the page transfer order of the print data so that the print data of the pages for the sheets staying in the duplex unit is transmitted to the printer 1000 by a preceding page control function.

Specifically speaking, such a function is realized by a process for changing a page sequence in S31 to S34 in the processing loop S21 to S35 shown in FIG. 8, which will be explained hereinafter.

In the embodiment, when there are no sheets in the cassette 1 which is used for execution of the printing, the apparatus waits for the stop of the printing operation of the printer. The host computer 3000 also has an instructing function in which the print data in the RAM 1019 which is provided for the printer 1000 and functions as a page memory is cleared prior to transmitting the next print data.

Specifically speaking, such a function is realized by a process for instructing to clear the print data in S31 in the processing loop S21 to S35 shown in FIG. 8, which will be explained hereinafter.

Further, the host computer 3000 also has a function in which after the print fault factor has been detected once, if it is determined again that the printer is in the state where the sheets can be fed from the cassette 1, the duplex printing process by the alternating feeding mode is restarted on the basis of the print data of other non-print pages.

Specifically speaking, duplex printing is restarted by a process in which after completion of S35, the processing routine is returned to S22, and the process of S24 is again executed in the processing loop S21 to S35 shown in FIG. 8, which will be explained hereinafter.

In the embodiment, as a print fault factor in the alternating feeding mode, the no-sheet error or the small remaining toner amount error of the printer 1000 is presumed. However, the invention is not limited to such an error but it is also possible to make control in consideration of a combination with another standby mode shift factor, or the like so long as the print fault factor occurs and the printer is shifted to the standby mode.

Figure 4:
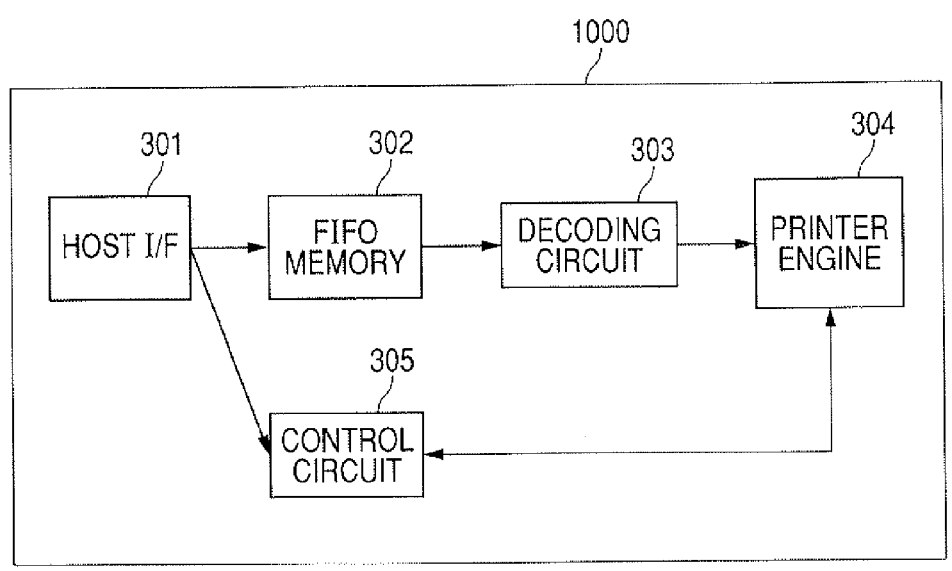
FIG. 4 is a block diagram showing an example of a construction of a data process of the printing apparatus shown in FIG. 2.

FIG. 4 is a block diagram showing each hardware function of the printer 1000 shown in FIG. 2.

In FIG. 4, reference numeral 301 denotes a host interface such as a USB interface for receiving the printer command from the host computer 3000.

There are a case where the host interface 301 is constructed by a bidirectional interface and a case where it is constructed by a network interface.

Reference numeral 302 denotes an FIFO memory for storing the image data (print data) received from the host interface 301.

A decoding circuit 303 decodes the image data (print data) stored in the FIFO memory 302 and outputs the decoded data to a printer engine 304. Reference numeral 305 denotes a control circuit for controlling a laser beam printer engine as shown in FIG. 1. The control circuit 305 is constructed by, for example, a CPU of one chip and controls the host interface 301, FIFO memory 302, decoding circuit 303, and printer engine 304.

The printing operation will be described hereinbelow.

When the user operates the application 202 on the host computer 3000 side and instructs the printing, the print instruction is sent from the application 202 to the printer driver 203 through the OS 201.

In the embodiment, image data (bit map image) is formed from drawing information, and compressed by the host computer 3000. The compressed image data is transferred to the printer 1000 together with various control commands or the like.

Although the embodiment will be described hereinbelow with respect to the image data as an example, the invention is not limited to such an example. For instance, the data of a page unit (data to be printed to one side of the medium) is extracted on the host computer 3000 side and if it is the data which can be transmitted to the printer, the print data of, for example, a page description language format can be applied.

For instance, it is also possible to use a form in which intermediate data of a pdf format is held by the host computer 3000 and page description language data of the necessary page is formed each time it is necessary. In the embodiment, by providing the data to a host base printer or the like, the costs of the memory can be minimized. Therefore, explanation will be made with respect to the case where the image data which is often used in the host base printer is used as an example of the print data.

The control command includes a job information command to instruct the presence or absence of the duplex printing, the designation of the number of print copies, and the like and a sheet size. The control command also includes a page information command to instruct a sheet type, a sheet feeding port, a sheet ejecting port, a length of line of the image data, the number of lines thereof, and the like.

The control command is outputted together with an end command indicative of the end of the page and a job end command to notify the host computer of the end of job.

In the duplex printing, there are two kinds of modes of a long-side binding and a short-side binding in dependence on whether the binding side of the sheets which are ejected from the printer engine 304 is the long side or the short side.

In the case of what is called a vertical feed in which the sheets are fed from the short side in the long-side binding mode and in the case of what is called a lateral feed in which the sheets are fed from the long side in the short-side binding mode, it is necessary to rotate the image of the reverse side by 180°.

Therefore, the printer driver 203 preliminarily rotate the direction of the image data to be outputted by 180° in accordance with the binding direction and the sheet feeding method as necessary. In the embodiment, a face-down tray is always designated as a sheet ejecting destination.

When printer commands are outputted from the printer driver 203, the OS 201 sequentially transfers the outputted printer commands to the language monitor 204. The language monitor 204 sequentially transmits the received printer commands to the printer 1000.

Prior to transmitting an image data command to the printer 1000, the language monitor 204 transmits a status request command, obtains the status of the printer 1000, and confirms that the image data command can be transmitted.

In the printer 1000, when the image data command is received through the port driver 205 of the host computer 3000, the control circuit 305 stores the image data into the FIFO memory 302.

When a page end command is received through the port driver 205 of the host computer 3000, the control circuit 305 instructs the printer engine 304 to start the printing.

When the print start is instructed as mentioned above, the printer engine 304 feeds the sheets from a selected one of the sheet cassettes shown in FIG. 1. When the fed sheet reaches a predetermined position, the printer engine 304 requests the output of the image data.

When the output of the image data is requested, the decoding circuit 303 reads out the image data compressed in the host computer 3000 from the FIFO memory 302 and outputs the decoded original image data to the printer engine 304.

At this time, the image data read out of the FIFO memory 302 is removed from the FIFO memory 302.

If the language monitor 204 determines that the status of the printer obtained from the printer 1000 indicates the completion of the printing of the page, the relevant page memory is opened. The page memory is held in the RAM 2002 or the external memory 2011 shown in FIG. 2.

Similarly, if the language monitor 204 determines that the obtained printer status indicates the error, re-transmission is tried from the sheet including the page whose printing is not normally finished.

The "sheet" corresponds to one sheet of paper and it is constructed by one page in the simplex printing mode and constructed by two pages in the duplex printing mode.

When transfer of the printer commands of all pages of the job to the printer 1000 is finished as mentioned above, the language monitor 204 waits for completion of the printing of all sheets of the job. When the printing of all of the sheets of the job is completed, the job is finished. In this manner, a series of printing processes is executed.

A data structure of sheet management tables 401 which are used by the language monitor 204 in the duplex printing will now be described with reference to FIG. 5.

Figure 5:
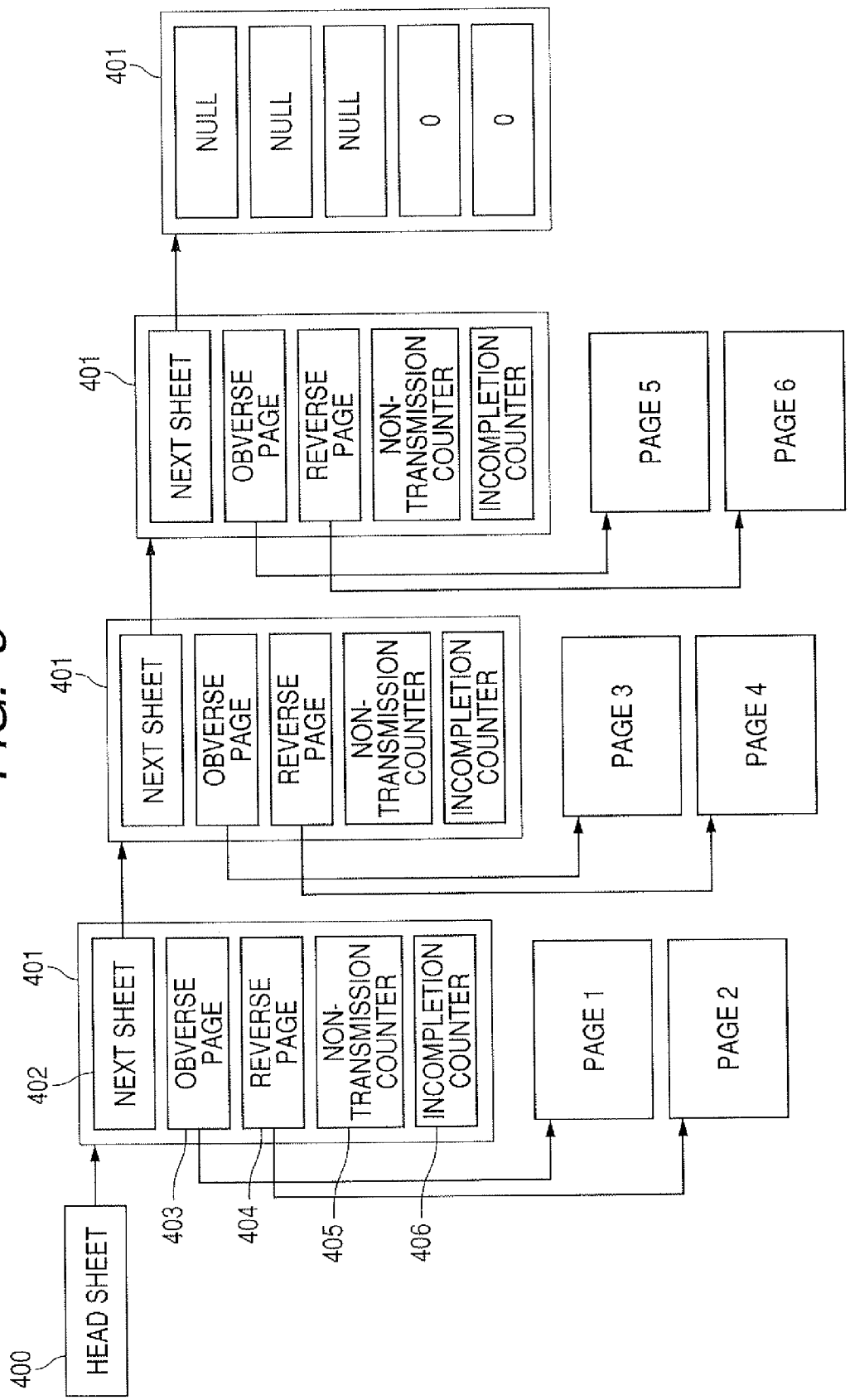
FIG. 5 is a diagram for explaining an example of a data structure in management tables which are used by a language monitor shown in FIG. 3.

FIG. 5 is a diagram for explaining the data structure of the management tables which are referred to by the language monitor 204 shown in FIG. 3. The embodiment shows an example of a job of six pages of a duplex sheet.

In FIG. 5, the sheet management table 401 includes: a next sheet address 402 showing an address of the next sheet management table 401; and an obverse page address 403 showing an address of a data buffer of the obverse page.

The next sheet address 402 showing the address of the next sheet management table 401 and the obverse page address 403 showing the address of the data buffer of the obverse page are managed in the RAM 2002.

The sheet management table 401 includes: a reverse page address 404 showing an address of a data buffer of the reverse page; a non-transmission counter 405 showing the number of print copies which are not transmitted yet; and an incompletion counter 406 showing the number of print copies which are not printed yet. In the duplex printing, it is necessary to manage the print control of the number of print copies on a sheet unit basis. The number of print copies is set as an initial value into each of those counters.

When the data of the corresponding sheet (both of the obverse and the reverse) is transmitted and when the printing of the corresponding sheet (both of the obverse and the reverse) is completed, a count value of each counter is updated (subtracted by "1"). By repetitively printing until the count value of each counter finally reaches "0", the printing of the number of print copies can be executed.

The reverse page address 404 showing the address of the data buffer of the reverse page, the non-transmission counter 405 showing the number of print copies which are not transmitted yet, and the incompletion counter 406 showing the number of print copies which are not printed yet are managed in the RAM 2002.

A linear list is formed by a head sheet management table address 400 and the next sheet address 402 in order of the printer commands received from the OS 201.

When the next sheet address 402 is NULL, this means that the next sheet management table 401 does not exist.

When the obverse page address 403 is NULL, this means that the relevant sheet is an empty sheet showing the end of the job.

When the reverse page address 404 is NULL, this means that the relevant sheet is a sheet whose reverse side does not exist and in which the simplex printing is executed.

The language monitor 204 forms and updates the sheet management table in the RAM 2002 in a real-time manner in accordance with a print situation. When the printer commands are received on a page unit basis, the language monitor 204 newly forms a management table.

The print situation in the printer 1000 is monitored through a communication line. If the completion of the data transfer and the completion of the printing are detected, the count value of each of the non-transmission counter and the incompletion counter of each management table is updated (subtracted by "1").

A data structure of transmission data management tables 411 which are used by the language monitor 204 in the duplex printing will now be described with reference to FIG. 6.

Figure 6:
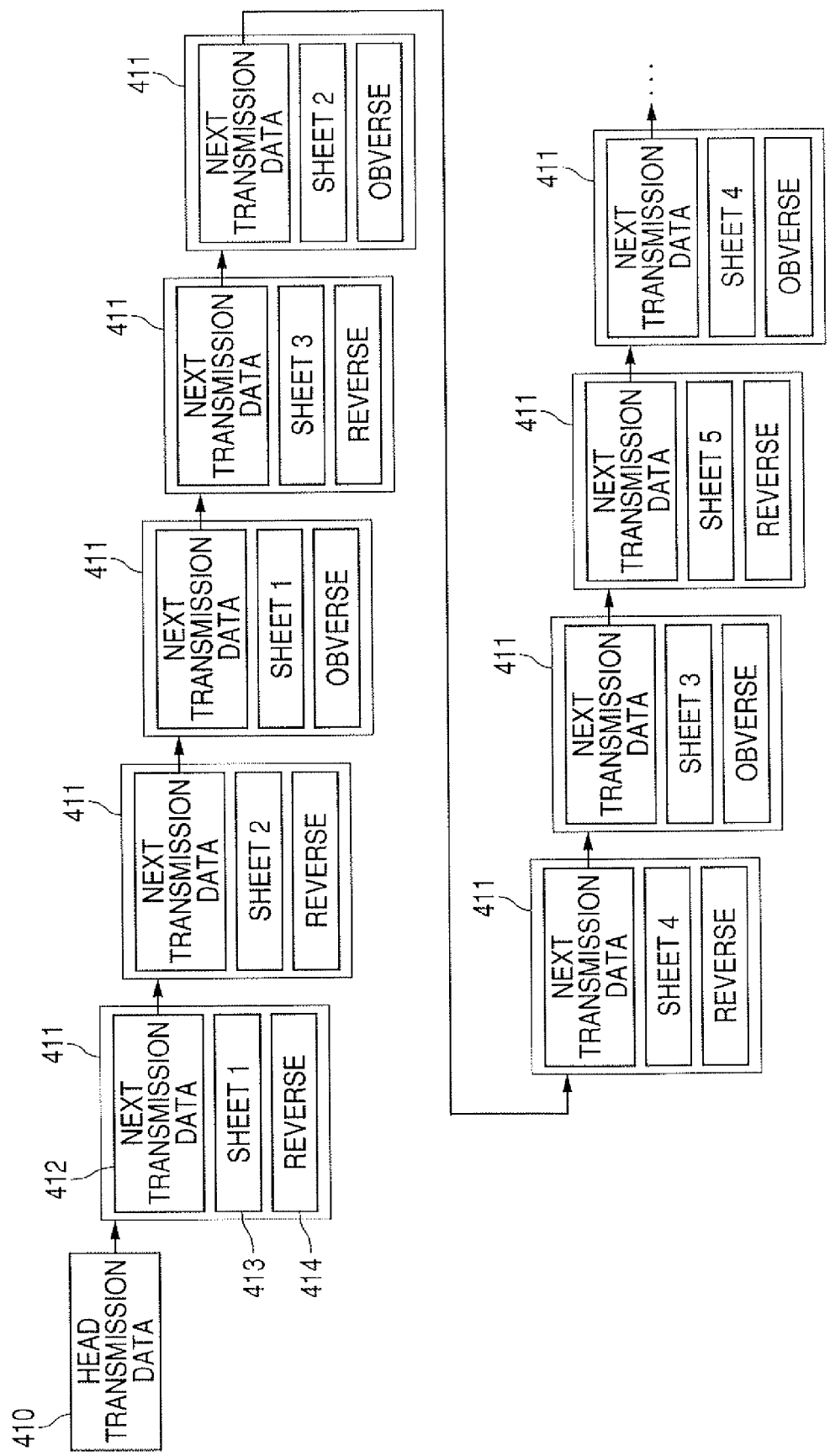
FIG. 6 is a diagram for explaining an example of a data structure in transmission data management tables which are used by the language monitor shown in FIG. 3.

FIG. 6 shows output order at the time when the language monitor 204 outputs the print data of each page to the port driver 205. Such output order can be also regarded as management information showing page order of the print data which is transmitted from the host computer 3000 to the printer 1000.

Although explanation will be made in FIG. 6 with respect to the tables as an example, the invention is not limited to the tables as a data holding method but another format can be also applied to.

FIG. 6 is a diagram for explaining the management information for managing the output order of the print data to the printer. That is, in the embodiment, FIG. 6 shows the data structure of the transmission data management tables which are used by the language monitor 204 shown in FIG. 3.

In FIG. 6, a next transmission data address 412 showing an address of the next transmission data management table 411 is included in the transmission data management table 411. The transmission data management table 411 also includes a sheet management table address 413 showing an address of the sheet management table 401 (described in FIG. 5) corresponding to the transmission data management table 411.

The transmission data management table 411 also includes a transmission data type 414 in which the type of transmission data management table 411 indicates either the obverse page in the simplex printing or the duplex printing or the reverse page in the duplex printing.

The transmission data management table 411 also includes the transmission data type 414 showing which one of empty tables into which the reverse page should be inserted in the case of the duplex printing by the two-sheet stay alternating feed.

Further, the transmission data management table 411 includes page numbers (not shown) showing the print order and forms a linear list by a head transmission data management table address 410 and the next transmission data address 412 in order at the time of executing the printing.

When the next transmission data address 412 is NULL, this means that the next transmission data management table does not exist. As mentioned above, in the case of ejecting the sheet in the face-down state, since the reverse side is printed before the obverse side, the reverse side of the same sheet is precedent to the obverse side in FIG. 6.

When the printing is instructed through a UI display screen (setting display screen) of the printer driver 203, the language monitor 204 forms and updates the management information in FIG. 6 in the RAM 2002 in a real-time manner while receiving the printer commands or executing the printing.

When the print instruction is made through the UI display screen (setting display screen) of the printer driver 203, the language monitor 204 forms and updates the transmission data management table in FIG. 6 on the basis of the sheet management tables in FIG. 5. When the sheet is added to the sheet management tables, the transmission data management table is added on the basis of information of the added sheet. On the other hand, when the printing of the sheet (both of the obverse and the reverse) is completed, the corresponding transmission data management table is updated (deleted). Naturally, the management information in FIG. 6 can be also formed and updated by the printer driver 203, the port driver 205, or other forming/updating modules.

The print order in the duplex printing by the two-sheet stay alternating feed will now be described.

In the case of performing the duplex printing, it is necessary to execute what is called "sheet re-feed" in which after the reverse side was printed, the front edge and the rear edge of the sheet are reversed, and thereafter, the sheet is conveyed to the photosensitive drum until the printing of the obverse side is started. Since the printing cannot be executed for the period of time of such "sheet re-feed" in the duplex printing of the one-sheet stay, the print speed decreases.

In the duplex printing by the two-sheet stay alternating feed, to solve such a problem, the second sheet (medium) is printed by using the period of time during which the foregoing reversal and sheet re-feed are being executed to the first sheet (medium) by the duplex unit.

There is also a case where the reversing operation and the sheet re-feed operation by the duplex unit are collectively called a conveying operation. The blank time of the execution of the printing is reduced by the duplex printing by the alternating feed, thereby consequently realizing the improvement of the print speed.

Specifically speaking, the duplex printing by the alternating feed is executed in accordance with following Rules R1 to R4.

R1: During the execution of the reverse side printing and the obverse side printing of the same sheet, two pages of another sheet are printed.

R2: The reverse side printing and the obverse side printing are alternately executed.

However, although the page corresponding to transmitting order 2 is the obverse side of the sheet that is precedent to the sheet 1, since such a page does not exist, the printing cannot be executed and there is a blank time for such a period of time.

Although the page corresponding to transmitting order 7 is the reverse side of the sheet 4, if such a page does not exist, the printing cannot be executed and there is a blank time for such a period of time.

R3: In the case of performing the duplex printing by the two-sheet stay alternating feed, since an upper limit of a length of sheet is restricted in dependence on a length of sheet conveying path or the like, the duplex printing in dependence on the two-sheet stay alternating feed cannot be executed to, for example, a sheet longer than a size in the lateral feed of the A4 size. In such a case, the duplex printing is executed by the one-sheet stay.

R4: When the duplex printing by the two-sheet stay alternating feed is executed, the printing cannot be executed in the case where the sheets of different sizes or different types exist mixedly.

The explanation has been made above with respect to the example in which while the language monitor 204 is forming and updating the sheet management tables shown in FIG. 5 and the transmission data management tables shown in FIG. 6, the print order is determined and the duplex printing by the two-sheet stay alternating feed is realized.

The processing operation of the printer 1000 when there are no sheets at the sheet feeding port during the duplex printing by the two-sheet stay alternating feed will now be described with reference to FIG. 7. FIGS. 7 and 8 show examples of a printing process by the sheet ejecting method in the printer whereby the sheets are ejected in the state where the print surface of the head page is in the face-down state.

Example of Face-Down Sheet Ejection

Figure 7:
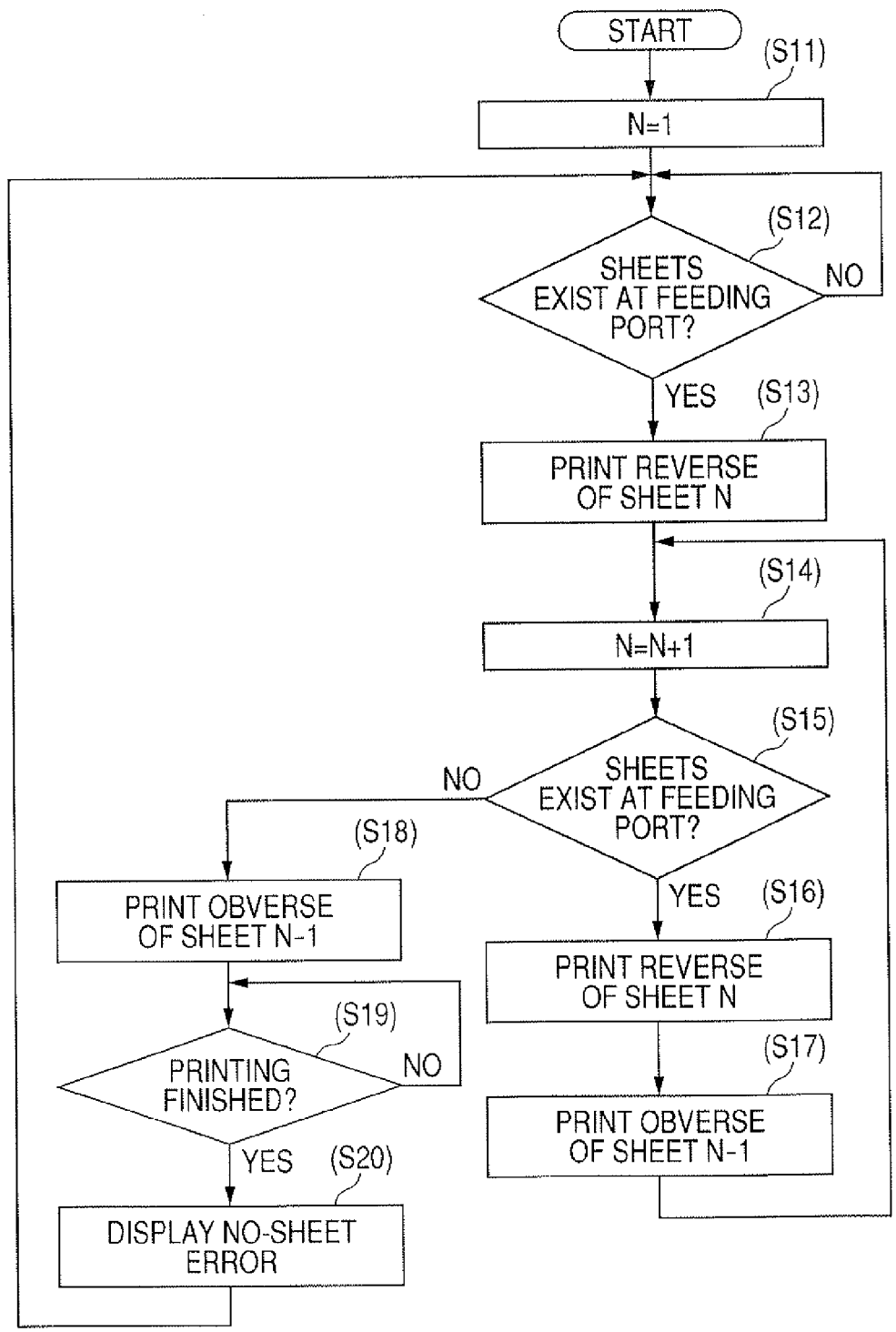
FIG. 7 is a flowchart showing an example of a first data processing procedure of the printing apparatus in the print system according to the invention.

FIG. 7 is a flowchart showing an example of a first data processing procedure of the printing apparatus in the print system according to the invention. S11 to S20 indicate processing steps. The steps are realized by a method whereby the CPU 1012 loads a control program stored in the HDD 1031 or the ROM 1013 into the RAM 1019 and executes it.

The processing example of the flowchart shown in FIG. 7 is shown to explain the operation of the printer 1000 which is executed until there are no sheets at the sheet feeding port during the job after the job of the duplex printing by the two-sheet stay alternating feed was started. All processes which are executed until the end of the job are not shown here.

In FIG. 7, in step S11, the CPU 1012 substitutes "1" for a sheet number N (stored in the RAM 1019) of the sheet which is subsequently fed from the sheet feeding port, thereby initializing. In S12, on the basis of an output state of a sensor (not shown), the CPU 1012 confirms whether or not the sheets exist at the sheet feeding port which is used to execute the printing.

If the CPU 1012 determines the presence of the sheets, the processing routine advances to S13. The decoded image data corresponding to the reverse side of the sheet N is received and an image corresponding to the image data is printed.

In S14, the CPU 1012 adds "1" to the sheet number N of the sheet which is subsequently fed.

Subsequently, in S15, on the basis of an output state of a position sensor (not shown), the CPU 1012 confirms whether or not the sheets exist at the sheet feeding port which is used to execute the printing. If the CPU 1012 determines the presence of the sheets, the reverse side of the sheet N is printed on the basis of the decoded image data in S16.

Subsequently, in step S17, the obverse side of the sheet (N−1) is printed on the basis of the decoded image data.

The processing routine is returned to S14. The processing loop S14 to S17 is repetitively executed so long as the sheets exist at the sheet feeding port, and the duplex printing by the two-sheet stay alternating feed is executed.

If the CPU 1012 determines in S15 that there are no sheets at the sheet feeding port, S18 follows.

In S18, in order to previously print the sheet (N−1) staying in the printer 1000 in which only the reverse side has already been printed, the printing of the obverse side of the sheet (N−1) is executed prior to the inherent printing of the reverse side of the sheet N.

In S19, the CPU 1012 confirms that the duplex printing of the sheet (N−1) has been finished. In S20, the no-sheet error is displayed to a display of the operation panel 1110 provided for the printer 1000 or a printer status display unit (user interface which is provided by the printer driver) of the host computer 3000, thereby promoting the user to supply the sheets to the sheet feeding port.

After the "no-sheet error" was displayed by one of the above methods, the processing routine is returned to S12 and the apparatus waits until the sheets are supplied to the sheet feeding port.

When the sheets are supplied to the sheet feeding port, the CPU 1012 advances to S14 and restarts the duplex printing by the two-sheet stay alternating feed from the printing of the reverse side of the sheet N.

The explanation has been made above with respect to the processing operation of the printer when there are no sheets at the sheet feeding port during the duplex printing by the two-sheet stay alternating feed. The operating processes of the host computer in this instance will now be described with reference to a flowchart of FIG. 8.

Figure 8:
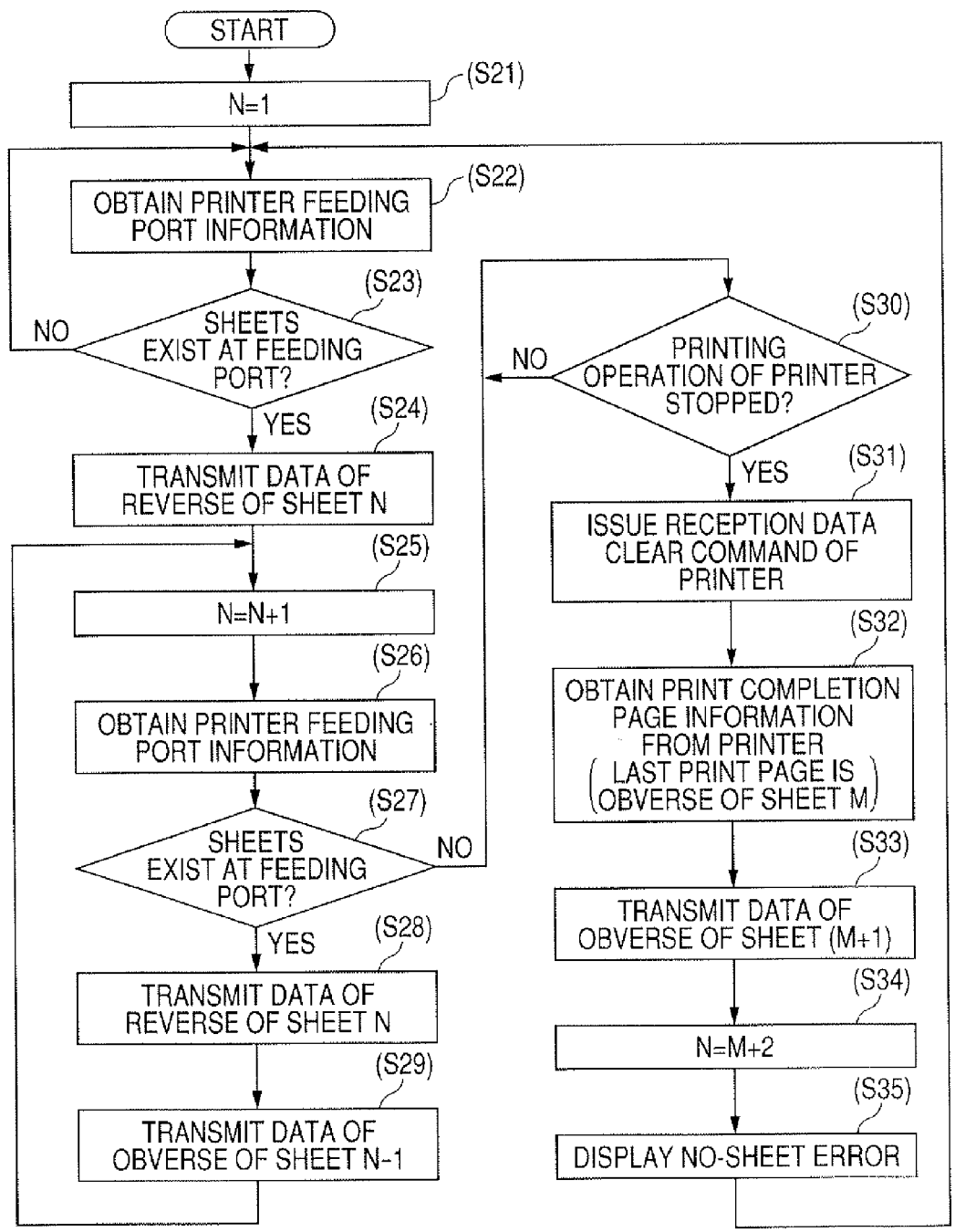
FIG. 8 is a flowchart showing an example of a first data processing procedure of an information processing apparatus in the print system according to the invention.

FIG. 8 is a flowchart showing an example of a first data processing procedure of an information processing apparatus in the print system according to the invention. S21 to S35 indicate processing steps. The steps are realized by a method whereby the CPU 2001 loads a control program stored in the external memory 2011 or the ROM 2003 into the RAM 2002 and executes it.

As described in FIG. 7, the procedure of the flowchart shown in FIG. 8 also explains the operation of the host computer until there are no sheets at the sheet feeding port during the job after the start of the job of the duplex printing by the two-sheet stay alternating feed. That is, the flowchart does not show the operation which is executed until the end of the job.

In FIG. 8, first, in S21, the CPU 2001 substitutes "1" for the sheet number N (managed in the RAM 2002) of the sheet of the print data which is transmitted to the printer 1000, thereby initializing.

Subsequently, in S22, the CPU 2001 issues a sheet presence/absence information obtaining command of the sheet feeding port to the printer 1000 and obtains a sheet presence/absence information status from the printer 1000. On the basis of the sheet presence/absence information status, in S23, the CPU 2001 discriminates whether or not the sheets exist at the sheet feeding port.

If the CPU 2001 determines that there are no sheets at the sheet feeding port, the apparatus waits until the sheets are supplied.

If the CPU 2001 determines in S23 that the sheets exist at the sheet feeding port, S24 follows and a process for outputting the print data according to the print page order which is managed by the management information in FIG. 6 to the printer through the interface is executed.

In the case of the embodiment, first, the print data of the reverse side of the sheet N is transmitted to the printer 1000. The image data (print data) to be outputted to the printer through the bidirectional I/F 2021 can be specified on the basis of the sheet management table address 413 and the transmission data type 414 with reference to the contents in the management information described in FIG. 6. Also in S28 and S33, which will be explained hereinafter, in a manner similar to the above, the image data (print data) to be outputted to the printer is specified with reference to the management information described in FIG. 6.

Subsequently, in S25, the CPU 2001 adds (increments) "1" to the sheet number N of the print data which is transmitted to the printer 1000. In S26, the CPU 2001 issues the sheet presence/absence information obtaining command of the sheet feeding port to the printer 1000 and obtains the status information showing the presence/absence of the sheets. As another method, various kinds of status information can be also actively transmitted from the printer 1000 to the host computer 3000.

The timing when the host computer 3000 receives and obtains the various kinds of status information from the printer 1000 is not always limited to the timing when one of the steps in the flowchart of FIG. 8 is executed. For example, the various kinds of status information can be also received and obtained from the printer 1000 every 100 msec.

In S27, on the basis of the obtained sheet presence/absence information status, the CPU 2001 discriminates whether or not the sheets exist at the sheet feeding port. If it is determined that the sheets exist, S28 follows and the CPU 2001 transmits the print data (image data) of the reverse side of the sheet N to the printer 1000. The print data may have been compressed by a predetermined compressing rule.

Subsequently, in S29, the print data of the obverse side of the sheet (N−1) is transmitted to the printer 1000. The processing routine is returned to S25.

After that, the processing loop S25 to S29 is repetitively executed so long as the sheets exist at the sheet feeding port of the printer 1000, and the print data is transmitted to the printer 1000 in print page order of the duplex printing by the two-sheet stay alternating feed.

However, during the printing, in S27, there is a case where the CPU 2001 determines that there are no sheets at the sheet feeding port of the printer 1000 from the sheet presence/absence information status from the printer 1000 at the time of the new sheet feed. In such a case, S30 follows and the apparatus waits until the printing operation of the printer 1000 during the process is stopped.

At this point of time, the sheet N in which only the reverse side has already been printed remains in the printer 1000. According to the order of the two-sheet stay alternating feed, although the page to be printed next is the reverse side of the sheet (N+1), since there are no sheets at the sheet feeding port, the printing operation has been stopped.

When the CPU 2001 confirms in S30 that the printing operation of the printer 1000 has been stopped, S31 follows.

First, the CPU 2001 issues a command to clear (reset) the FIFO memory 302 in which the reception data of the printer 1000 has been stored to the printer 1000.

Consequently, all of the print data stored in the RAM 1019 or the HDD 1031 of the printer 1000 is abandoned.

Subsequently, in S32, a process to specify the non-print page in the staying medium which has already been fed and whose one side has already been printed is executed. Specifically speaking, the CPU 2001 issues a print information obtaining command to the printer 1000 and obtains print completion page information as a status from the printer 1000. The print completion page information is, for example, information to which the total number of surfaces whose printing has actually been completed can be applied. For instance, if a job of ten pages was printed by two print copies, the final print completion page information is equal to a value "20". Information of a combination of information indicative of the actual number of pages and information indicative of the print copy number may be used as print completion page information.

It is now assumed that the CPU 2001 is notified of information showing that the final print completion page is the "obverse side of a sheet M (corresponding to the ejection of the one-precedent sheet)" from the printer 1000. By identifying the obverse side of the sheet M as a final print completion page, information (showing which side of which sheet has already been printed) regarding the medium in which only one side (reverse side) has already been printed and which is staying in the duplex unit of the printer 1000 can be specified. On the basis of the information regarding the staying medium which has been specified, the page whose print data should be preferentially transmitted to the printer is specified.

In S33, to change the print page order by the alternating feed, the output of the print data which takes the change in the print page order into consideration is executed.

That is, the print data of the non-print page in the staying medium which has already been fed and whose one side has already been printed is outputted to the printer.

Specifically speaking, on the basis of the value of M specified in S32, the print data of the obverse side of a sheet (M+1) is transmitted to the printer 1000 and the printing is precedently (preferentially) executed to the obverse side of the sheet M staying in the printer 1000. By this process, the duplex printing of the medium staying in the printer 1000 can be completed and the medium can be ejected.

In S34, in association with the change of the output order of the print data in S32, output order of the print data at the time of the restart of the duplex printing (it is again determined to be YES in S23) after the print fault factor (no-sheet) was eliminated is reconstructed. That is, reconstructed new management information of FIG. 6 is formed.

Specifically speaking, (M+2) is substituted for the sheet number N of the print data to be transmitted and the print restart sheet number in the case where the sheets have been supplied is set into the RAM 2002.

Subsequently, in S35, the "no-sheet error" is displayed on the display of the printer 1000 or to the printer status of the host computer 3000 is displayed on a UI display screen (not shown) on the CRT 2010 through the printer driver.

In this state, the processing routine is returned to S22 and the apparatus waits until the sheets are supplied to the sheet feeding port. If the sheets were supplied, the processing operation similar to that described so far is executed except that an initial value of the sheet number N of the print data to be transmitted differs.

More specifically speaking, the output order of the print data inherently corresponding to the alternating feed duplex printing is changed by the process of S33.

Therefore, when the print fault factor is eliminated, the management information showing the order of transmitting the print data of the non-print pages to the printer 1000 from the host computer 3000 is reconstructed. The host computer 3000 refers to the reconstructed management information and the print data of the non-print portions is transmitted to the printer.

Figure 9:
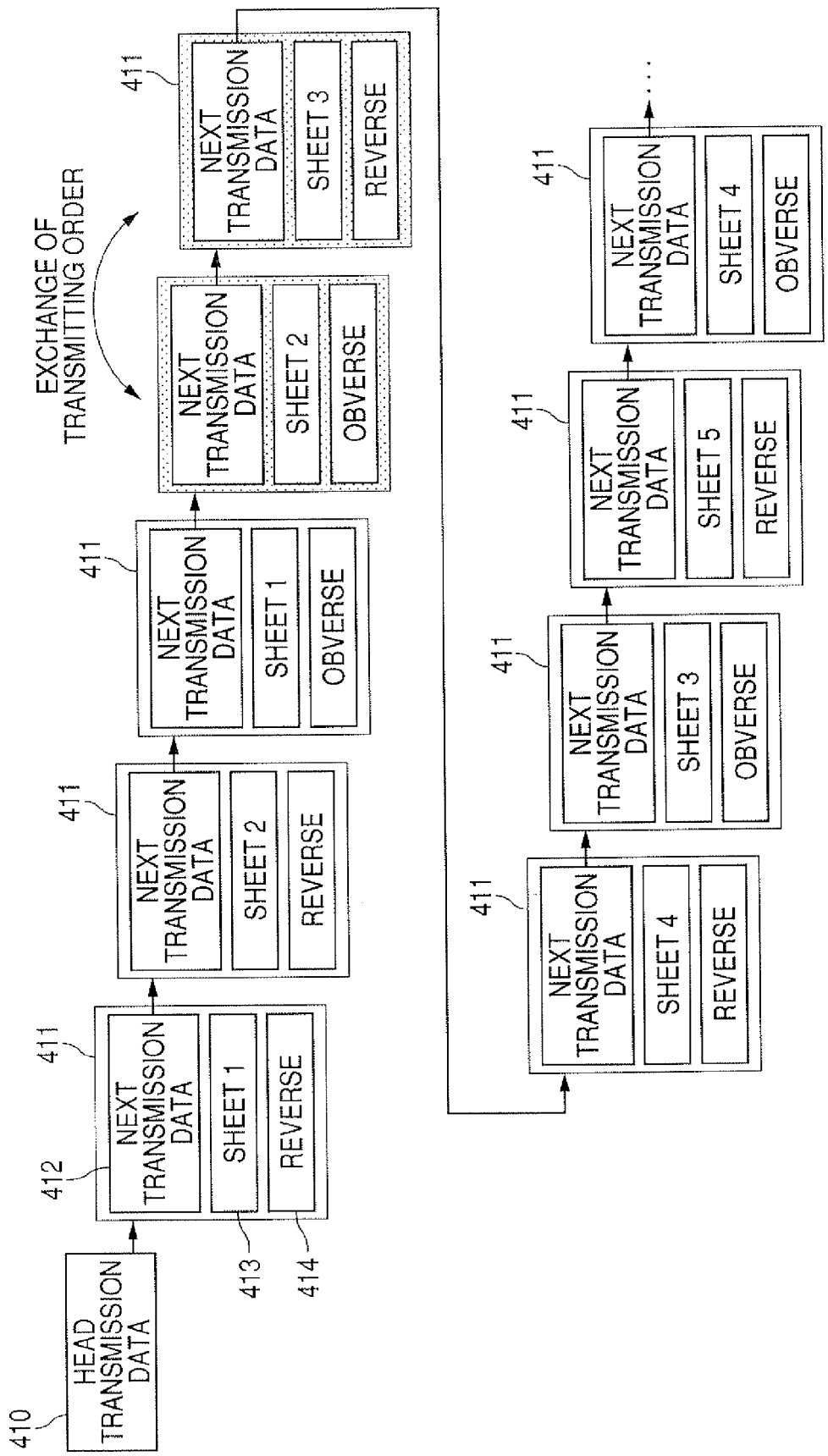
FIG. 9 is a diagram for explaining an example of the data structure in the transmission data management tables which are used by the language monitor shown in FIG. 3.

In the case where only two sheets were set to the sheet feeding port of the printer and the printing was executed, since the reverse side of the sheet of the sheet number 3 in FIG. 6 cannot be printed because of no-sheet, its transmitting order is replaced by the transmitting order of the print data of the obverse side of the sheet of the sheet number 2 in accordance with the foregoing procedure. Consequently, print data output order as shown in FIG. 9 is obtained.

As described above, according to the first embodiment, the following control is made to a print system like a host-based print system in which the memory of a large capacity cannot be provided for the printer because of the increase in costs.

Specifically speaking, if the print fault factor occurred during the duplex printing by the alternating feed, the host computer preferentially transmits the print data of the non-print side of the medium staying in the printer to the printer.

Thus, since the sheet does not stay in the printer for a long period of time, there is such an effect that the curl of the sheet or the forced sheet ejection due to the time-out of the printer can be avoided.

Second Embodiment

The first embodiment has been described on the assumption that if the print fault factor occurred during the duplex printing by the two-sheet stay alternating feed, the print data of the obverse side of the medium staying in the printer is preferentially transmitted to the printer the host computer 3000.

In the description of the printer in FIG. 2, it is assumed that in the case of transferring the image by the intermediate transfer member 9 and ejecting the medium as it is to the delivery unit 37, the transfer surface is upside down and the medium is ejected to the face-down tray.

However, for example, there is also an apparatus in which the transfer surface is upside up and the medium is ejected to the face-up tray in dependence on the ejecting mechanism of the medium. In such a case, first, the printing is performed from the obverse side of the sheet 1. If the medium remains in the printer, the print data of the reverse side is preferentially outputted to the printer from the host computer 3000.

Figure 10:
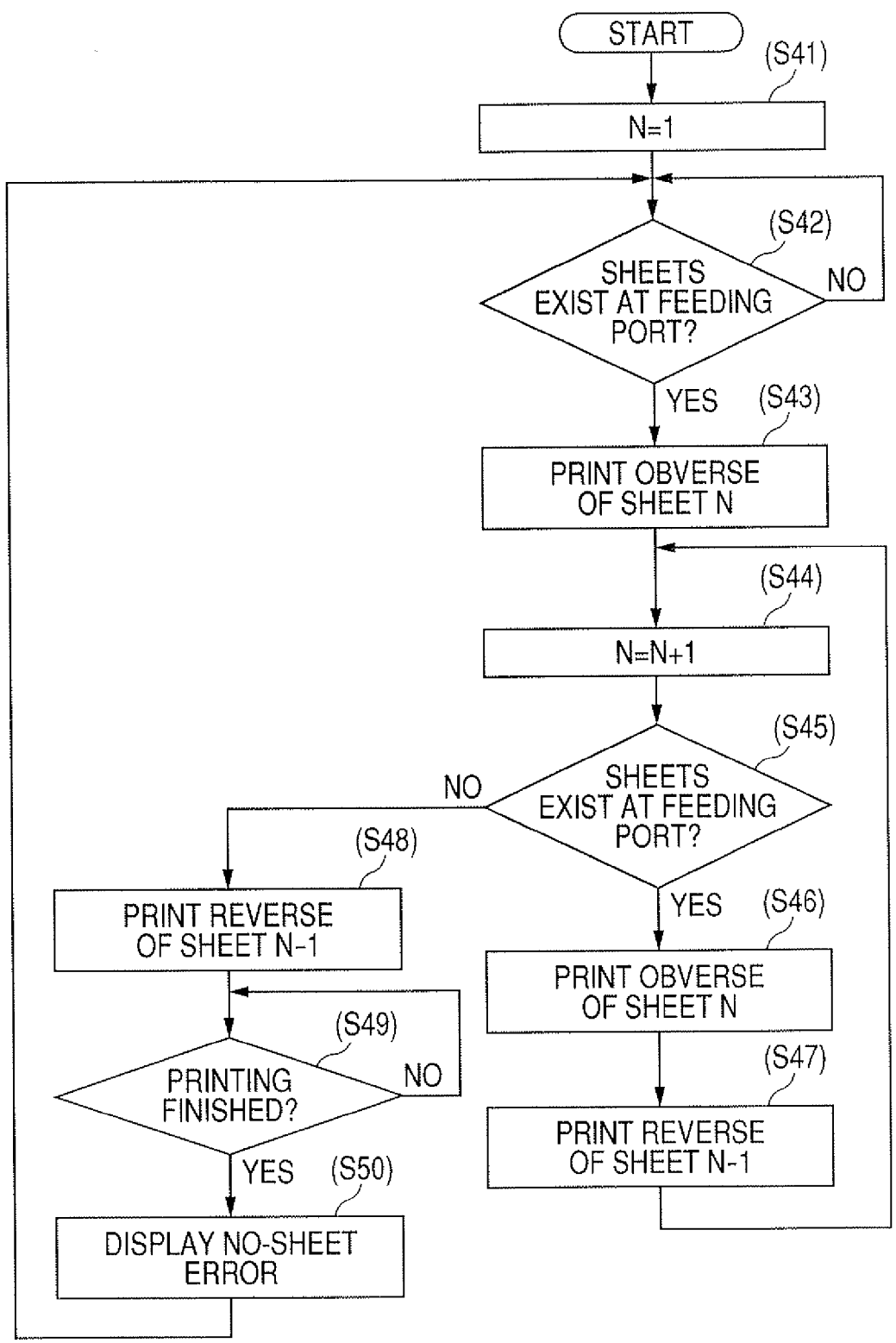
FIG. 10 is a flowchart showing an example of a second data processing procedure of the printing apparatus in the print system according to the invention.
Figure 11:
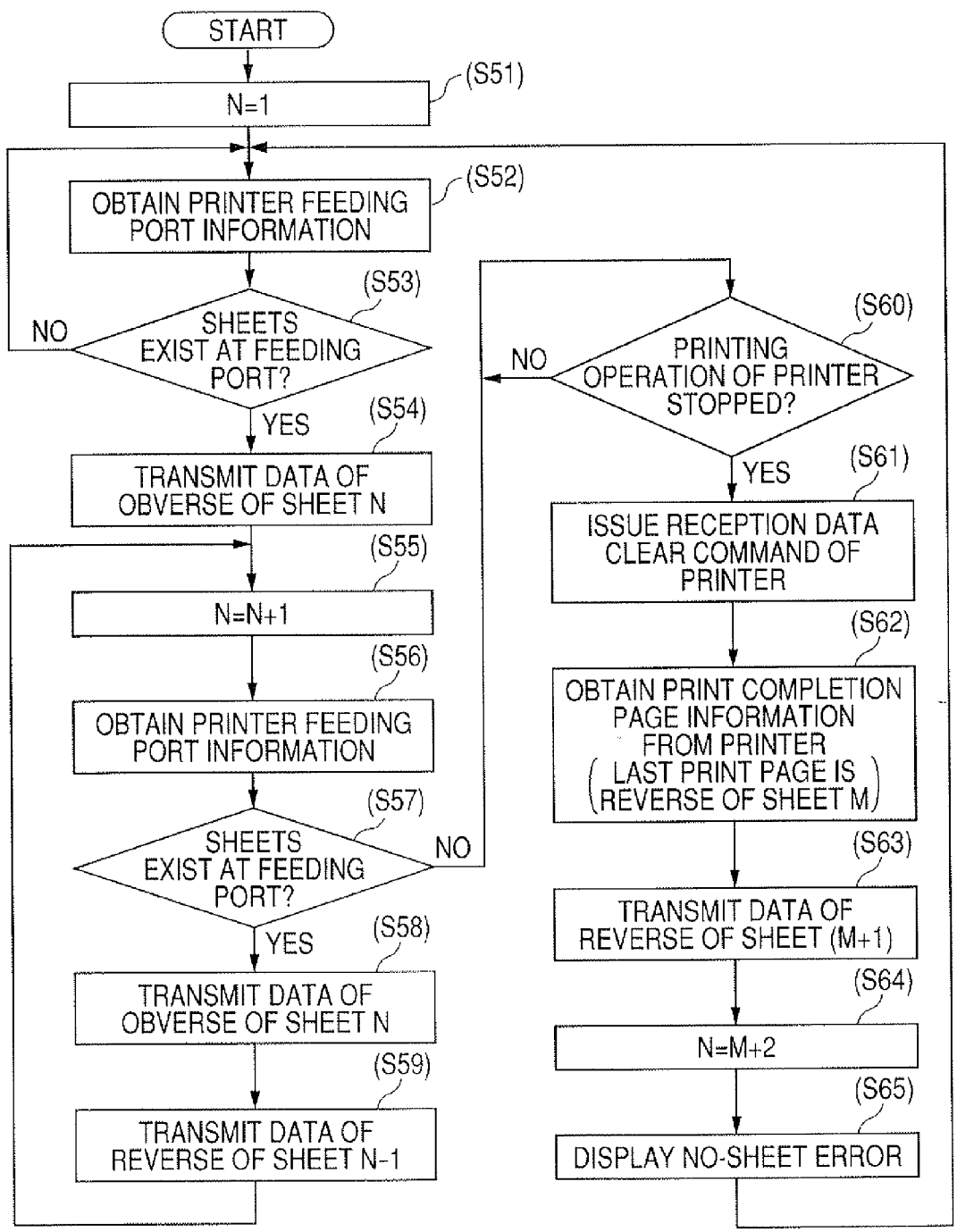
FIG. 11 is a flowchart showing an example of the second data processing procedure of the information processing apparatus in the print system according to the invention.

FIGS. 10 and 11, which will be explained hereinafter, relate to an example of a printing process by the sheet ejecting method of the printer whereby the medium is ejected in the state where the print side of the head page is set to the face-up state. Also in the case of ejecting the sheet to the face-up tray, a processing procedure similar to that in the face-down tray sheet ejection is fundamentally executed only except that the processes of the obverse side and the reverse side of each sheet are opposite to those in the face-down tray sheet ejection.

Example of the Face-Up Sheet Ejection

FIG. 10 is a flowchart showing an example of a second data processing procedure of the printer in the print system according to the invention. S41 to S50 indicate processing steps. The steps are realized by a method whereby the CPU 1012 loads the control program stored in the HDD 1031 or the ROM 1013 into the RAM 1019 and executes it.

The processing example of the flowchart shown in FIG. 10 is shown to explain the operation of the printer 1000 which is executed until there are no sheets at the sheet feeding port during the job after the job of the duplex printing by the two-sheet stay alternating feed was started. All processes which are executed until the end of the job are not shown here.

In FIG. 10, in step S41, the CPU 1012 substitutes "1" for the sheet number N (stored in the RAM 1019) of the sheet which is subsequently fed from the sheet feeding port, thereby initializing. In S42, on the basis of the output state of the sensor (not shown), the CPU 1012 confirms whether or not the sheets exist at the sheet feeding port which is used to execute the printing.

If the CPU 1012 determines the presence of the sheets, the processing routine advances to S43. The decoded image data corresponding to the obverse side of the sheet N is received and an image corresponding to the image data is printed.

In step S44, the CPU 1012 adds "1" to the sheet number N of the sheet which is subsequently fed.

Subsequently, in step S45, on the basis of the output state of the position sensor (not shown), the CPU 1012 confirms whether or not the sheets exist at the sheet feeding port which is used to execute the printing. If the CPU 1012 determines the presence of the sheets, the obverse side of the sheet N is printed on the basis of the decoded image data in S46.

Subsequently, in step S47, the CPU 1012 allows the reverse side of the sheet (N−1) to be printed on the basis of the decoded image data.

The processing routine is returned to S44. The processing loop S44 to S47 is repetitively executed so long as the sheets exist at the sheet feeding port, and the duplex printing by the two-sheet stay alternating feed is executed.

If the CPU 1012 determines in S45 that there are no sheets at the sheet feeding port, S48 follows.

In S48, in order to previously print the sheet (N−1) staying in the printer 1000 in which only the obverse side has already been printed and eject it, the printing of the reverse side of the sheet (N−1) is executed prior to the inherent printing (S46) of the obverse side of the sheet N.

In S49, the CPU 1012 confirms that the duplex printing of the sheet (N−1) has been finished. In S50, the no-sheet error is displayed to the display of the operation panel 1110 provided for the printer 1000 or to the printer status display unit (user interface which is provided by the printer driver) of the host computer 3000, thereby promoting the user to supply the sheets to the sheet feeding port.

When the "no-sheet error" is displayed by one of the above methods, the processing routine is returned to S42 and the apparatus waits until the sheets are supplied to the sheet feeding port.

When the sheets are supplied to the sheet feeding port, the CPU 1012 advances to S44 and restarts the duplex printing by the two-sheet stay alternating feed from the printing of the obverse side of the sheet N. In other words, the apparatus waits for the print data of the obverse side of the sheet N from the host.

The explanation has been made above with respect to the processing operation of the printer when there are no sheets at the sheet feeding port during the duplex printing by the two-sheet stay alternating feed. The operating processes of the host computer in this instance will now be described with reference to a flowchart of FIG. 11.

FIG. 11 is a flowchart showing an example of a second data processing procedure of an information processing apparatus in the print system according to the invention. S51 to S65 indicate processing steps. The steps are realized by a method whereby the CPU 2001 loads a control program stored in the external memory 2011 or the ROM 2003 into the RAM 2002 and executes it.

As described in FIG. 10, the procedure of the flowchart shown in FIG. 11 also explains the operation of the host computer until there are no sheets at the sheet feeding port during the job after the start of the job of the duplex printing by the two-sheet stay alternating feed. That is, the flowchart does not show the operation which is executed until the end of the job.

In FIG. 11, first, in S51, the CPU 2001 substitutes "1" for the sheet number N (managed in the RAM 2002) of the sheet of the print data which is subsequently transmitted to the printer 1000, thereby initializing.

Subsequently, in S52, the CPU 2001 issues the sheet presence/absence information obtaining command of the sheet feeding port to the printer 1000 and obtains the sheet presence/absence information status from the printer 1000. On the basis of the sheet presence/absence information status, in S53, the CPU 2001 discriminates whether or not the sheets exist at the sheet feeding port.

If the CPU 2001 determines that there are no sheets at the sheet feeding port, the apparatus waits here until the sheets are supplied.

If the CPU 2001 determines in S53 that the sheets exist at the sheet feeding port, S54 follows and the process for outputting the print data according to the print page order which is managed by the management information in FIG. 6 to the printer through the interface is executed.

In the case of the embodiment, first, the print data of the obverse side of the sheet N is transmitted to the printer 1000. The image data (print data) to be outputted to the printer through the bidirectional I/F 2021 can be specified on the basis of the sheet management table address 413 and the transmission data type 414 with reference to the contents in the management information described in FIG. 6. Also in S58 and S63, which will be explained hereinafter, in a manner similar to the above, the image data (print data) to be outputted to the printer is specified with reference to the management information described in FIG. 6.

Subsequently, in S55, the CPU 2001 adds (increments) "1" to the sheet number N of the print data which is transmitted to the printer 1000. In S56, the CPU 2001 issues the sheet presence/absence information obtaining command of the sheet feeding port to the printer 1000 and obtains the status information showing the presence/absence of the sheets. As another method, various kinds of status information can be also actively transmitted from the printer to the host computer 3000.

The timing when the host computer 3000 receives and obtains the various kinds of status information from the printer is not always limited to the timing when one of the steps in the flowchart of FIG. 10 is executed. For example, the various kinds of status information can be also received and obtained from the printer 1000 every 100 msec.

In S57, on the basis of the obtained sheet presence/absence information status, the CPU 2001 discriminates whether or not the sheets exist at the sheet feeding port. If it is determined that the sheets exist, step S58 follows and the CPU 2001 transmits the print data (image data) of the obverse side of the sheet N to the printer 1000. The print data may have been compressed by the predetermined compressing rule.

Subsequently, in S59, the print data of the reverse side of the sheet (N−1) is transmitted to the printer 1000. The processing routine is returned to S55.

After that, the processing loop S55 to S59 is repetitively executed so long as the sheets exist at the sheet feeding port of the printer 1000, and the print data is transmitted to the printer 1000 in the print page order of the duplex printing by the two-sheet stay alternating feed.

However, during the printing, in S57, there is a case where the CPU 2001 determines that there are no sheets at the sheet feeding port of the printer 1000 from the sheet presence/absence information status from the printer 1000 at the time of the new sheet feed. In such a case, S60 follows and the apparatus waits until the printing operation of the printer 1000 during the process is stopped.

At this point of time, the sheet N in which only the obverse side has already been printed remains in the printer 1000. According to the order of the two-sheet stay alternating feed, although the page to be printed next is the obverse side of the sheet (N+1), since there are no sheets at the sheet feeding port, the printing operation has been stopped.

When the CPU 2001 confirms in S60 that the printing operation of the printer 1000 has been stopped, S61 follows.

First, the CPU 2001 issues the command to clear (reset) the FIFO memory 302 in which the reception data of the printer 1000 has been stored to the printer 1000.

Consequently, all of the print data stored in the RAM 1019 or the HDD 1031 of the printer 1000 is abandoned.

Subsequently, in S62, the process to specify the non-print page in the staying medium which has already been fed and whose one side has already been printed is executed. Specifically speaking, the CPU 2001 issues the print information obtaining command to the printer 1000 and obtains the print completion page information as a status from the printer 1000. The print completion page information is, for example, information to which the total number of surfaces whose printing has actually been completed can be applied. For instance, if the job of ten pages was printed by two print copies, the final print completion page information is equal to the value "20". The information of the combination of the information indicative of the actual number of pages and the information indicative of the print copy number may be used as print completion page information.

It is now assumed that the printer 1000 notified the CPU 2001 of information showing that the final print completion page is the "reverse side of the sheet M (corresponding to the ejection of the one-precedent sheet)". By identifying the reverse side of the sheet M as a final print completion page, information (showing which side of which sheet has already been printed) regarding the medium in which only one side (obverse side) has already been printed and which is staying in the duplex unit of the printer 1000 can be specified. On the basis of the information regarding the staying medium which has been specified, the page whose print data should be preferentially transmitted to the printer is specified.

In S63, to change the print page order by the alternating feed, the output of the print data which takes the change in the print page order into consideration is executed.

That is, the print data of the non-print page in the staying medium which has already been fed and whose one side has already been printed is outputted to the printer.

Specifically speaking, on the basis of the value of M specified in S62, the print data of the reverse side of a sheet (M+1) is transmitted to the printer 1000 and the printing is precedently (preferentially) executed to the reverse side of the sheet M staying in the printer 1000. By this process, the duplex printing of the medium staying in the printer 1000 can be completed and the medium can be ejected.

In S64, in association with the change of the output order of the print data in S62, the output order of the print data at the time of the restart of the duplex printing (it is again determined to be YES in S63) after the print fault factor (no-sheet) was eliminated is reconstructed. That is, the reconstructed new management information of FIG. 6 is formed.

Specifically speaking, (M+2) is substituted for the sheet number N of the print data to be transmitted and the print restart sheet number in the case where the sheets have been supplied is set into the RAM 2002.

Subsequently, in S65, the "no-sheet error" is displayed on the display of the printer 1000 or the printer status of the host computer 3000 is displayed on the UI display screen (not shown) on the CRT 2010 through the printer driver.

In this state, the processing routine is returned to S52 and the apparatus waits until the sheets are supplied to the sheet feeding port. If the sheets were supplied, the processing operation similar to that described so far is executed except that an initial value of the sheet number N of the print data to be transmitted differs.

More specifically speaking, the output order of the print data inherently corresponding to the alternating feed duplex printing is changed by the process of S63.

Therefore, when the print fault factor is eliminated, the management information showing the order of transmitting the print data of the non-print pages to the printer 1000 from the host computer 3000 is reconstructed. The host computer 3000 refers to the reconstructed management information and the print data of the non-print portions is transmitted to the printer.

Third Embodiment

In the first embodiment, the processing operations of the host computer and the printer when the no-sheet error occurred during the duplex printing by the two-sheet stay alternating feed have mainly been described.

In the third embodiment, the processing operation in the first embodiment is also executed in the case where, for example, the error of the small remaining toner amount occurred as an example in which such a fault that the printing cannot be continued occurred during the continuous printing in place of the error such as no-sheet or the like described in the first embodiment. The small remaining toner amount error in this instance indicates the state where the remaining toner amount is equal to an amount in which only a few remaining pages or only about tens of pages can be printed at normal concentration. Although explanation will be made hereinbelow with respect to the toner as an example, naturally, the invention can be also applied to another recording material such as ink or the like.

Specifically speaking, in the process of S27, it is preferable to discriminate whether or not the small remaining toner amount error has occurred ("Small remaining toner amount error occurred?") in place of the discrimination about whether or not the sheets exist at the sheet feeding port ("Sheets exist at feeding port?"). If the small remaining toner amount error occurred, it is determined to be NO in a processing step corresponding to S27 and processes similar to those in the first embodiment are executed in S31 and subsequent steps.

Thus, since the sheet does not stay in the printer for a long period of time, there is such an effect that the curl of the sheet or the forced sheet ejection due to the time-out of the printer can be avoided.

The invention is not limited to the small remaining toner amount error so long as the error relates to the example in which such a fault that the printing cannot be continued occurred during the continuous printing.

Fourth Embodiment

The above embodiment has been described with respect to the case where the print data formed by the application of the host computer 3000 is duplex-printed by the two-sheet stay alternating feed control.

In the embodiment, in the case of arranging a plurality of pages onto one sheet and printing, the invention can be also applied to the case where the host computer 3000 reduces the image data of a plurality of pages, arrange them onto one sheet, forms the print data of one page, and executes the duplex printing.

Fifth Embodiment

The above embodiment has been described with respect to the case where the print data formed by the application of the host computer 3000 is duplex-printed by the two-sheet stay alternating feed control.

In the embodiment, the invention can be also applied to the case where the image data stored in a memory device built in a cellular phone or a digital camera is read out through a memory interface equipped for the printer 1000 in place of the host computer 3000 and an image is directly printed. For instance, the invention can be similarly applied by adjusting reading order of the image data which is read out of the memory device.

Sixth Embodiment

The above embodiment has been described with respect to the case where the print data formed by the application of the host computer 3000 is duplex-printed by the two-sheet stay alternating feed control.

In the embodiment, in the two-sheet stay alternating feed control sequence, in the case where the no-sheet error occurred in the cassette 1 and the apparatus enters the standby mode, there is a case where it is possible to recognize the fact that the sheets of the same size as that of the sheet which is being fed have been set to a manual tray shown in FIG. 1. In such a case, unlike the cassette 1, whether or not the sheets can be fed from the manual tray is discriminated between S30 and S31 shown in FIG. 8 so that the sheet feeding method can be switched to the sheet feed from the manual tray. The two-sheet stay alternating feed control sequence can be also continued in accordance with a result of such a discrimination.

Seventh Embodiment

A construction of data processing programs which can be read out by the print system according to the invention will be described hereinbelow with reference to memory maps shown in FIGS. 12 and 13.

FIG. 12 is a diagram for explaining the memory map of a storing medium for storing the various data processing programs which can be read by the printing apparatus according to the invention.

FIG. 13 is a diagram for explaining the memory map of a storing medium for storing the various data processing programs which can be read by the information processing apparatus according to the invention.

Although not shown particularly, there is also a case where information to manage a group of programs which are stored into the storing medium, for example, version information, an implementor, and the like are also stored, and information depending on the OS or the like of the program reading side, for example, icons or the like to identify and display the programs are stored.

Further, data which depends on the various programs is also managed in the directory. There is also a case where a program to install the various kinds of programs into the computer and, in the case where the program to be installed has been compressed, a program for decoding it, and the like are also stored.

The functions shown in FIGS. 7, 8, 10, and 11 in the embodiments may be executed by the host computer in accordance with the program which is installed from the outside. In such a case, the invention is also applied to the case where an information group including the programs is supplied to the output apparatus from a storing medium such as CD-ROM, flash memory, FD, or the like or from an external storing medium through a network.

Naturally, the object of the invention is also accomplished by a method whereby the storing medium in which program codes of software for realizing the functions of the embodiments mentioned above have been recorded is supplied to a system or an apparatus and a computer (or a CPU or an MPU) of the system or the apparatus reads out the program codes stored in the storing medium and executes them.

In such a case, the program codes themselves read out of the storing medium realize the novel functions of the invention and the storing medium in which the program codes have been stored constructs the invention.

Therefore, a form of the program is not limited so long as it has a function of the program, that is, object codes, a program which is executed by an interrupter, script data which is supplied to the OS, or the like can be used.

As a storing medium for supplying the program, for example, a flexible disk, a hard disk, an optical disk, a magnetooptic disk, an MO, a CD-ROM, a CD-R, a CD-RW, a magnetic tape, a non-volatile memory card, a ROM, a DVD, or the like can be used.

In this case, the program codes themselves read out of the storing medium realize the functions of the embodiments mentioned above and the storing medium in which the program codes have been stored constructs the invention.

As another program supplying method, the computer is connected to Homepage of the Internet by using the browser of the client computer. The computer program itself of the invention or a compressed file including an automatic installing function is downloaded from the Homepage to a recording medium such as a hard disk or the like, so that the program can be supplied. The program supplying method can be also realized by dividing the program codes constructing the program of the invention into a plurality of files and downloading the files from different Homepages. That is, a WWW server, an ftp server, or the like for allowing a plurality of users to download the program files for realizing the functional processes of the invention by the computer are also incorporated in claims of the invention.

The program of the invention is encrypted, stored into the storing medium such as a CD-ROM or the like, and distributed to the users. The user who has satisfied a predetermined condition is allowed to download key information for decrypting the encryption from Homepage through the Internet. By using the key information, the encrypted program is executed and installed into the computer and the functions of the embodiments can be also realized.

Naturally, the invention incorporates not only the case where the computer executes the read-out program codes, so that the functions of the embodiments as mentioned above are realized but also the case where an OS (Operating System) or the like which is operating on the computer executes a part or all of the actual processes on the basis of instructions of the program codes, and the functions of the embodiments as mentioned above are realized by those processes.

Further, naturally, the invention also incorporates the case where the program codes read out of the storing medium are written into a memory provided for a function expanding board inserted in the computer or a function expanding unit connected to the computer, thereafter, a CPU or the like provided for the function expanding board or the function expanding unit executes a part or all of the actual processes on the basis of instructions of the program codes, and the functions of the embodiments as mentioned above are realized by those processes.

The invention is not limited to the foregoing embodiments but many modifications (including an organic combination of the embodiments) are possible on the basis of the spirit of the invention and they are not excluded from the scope of the invention.

Although the various examples and embodiments of the invention have been described above, it will be understood by those skilled in the art that the spirit and scope of the invention are not limited to the specific explanation in the Description.

While the present invention has been described with reference to exemplary embodiments, it is to be understood that the invention is not limited to the disclosed exemplary embodiments. The scope of the following claims is to be accorded the broadcast interpretation so as to encompass all such modifications and equivalent structures and functions.

This application claims the benefit of Japanese Patent Application Nos. 2005-351484, filed Dec. 6, 2005, and 2006-050298, filed Feb. 27, 2006, which are hereby incorporated by reference herein in their entirety.

What is claimed is:

1. An information processing apparatus which can communicate with a printing apparatus which can execute an alternating sheet feed constructed in such a manner that in advance of printing of the other side of a first medium whose one side has already been printed, a second medium is fed from a sheet feeding portion, one side of the second medium is printed, a conveying operation for duplex printing of the first medium is executed in parallel with the printing of one side of the second medium, and after completion of the printing of one side of the second medium, the first medium to which the conveying operation for the duplex printing has been executed is fed, thereby executing the duplex printing, said information processing apparatus comprising:
a first output unit adapted to output print data according to print page order based on the alternating sheet feed to the printing apparatus through an interface;
a first obtaining unit adapted to obtain status information of the printing apparatus;
a second obtaining unit adapted to obtain situation information of the printing based on the print data; and
a second output unit adapted to output the print data of a non-print page in the staying medium which has already been fed and whose one side has already been printed to the printing apparatus in order to change the print page order based on the alternating sheet feed when a print fault factor in a sheet feed of the new medium is detected on the basis of the status information obtained by said first obtaining unit.

2. An information processing apparatus according to claim 1, further comprising a page output order changing unit adapted to change output order management information of the print data to the printing apparatus on the basis of the status information obtained by said first obtaining unit when the print fault factor is detected.

3. An information processing apparatus according to claim 2, wherein output order of the print data at the time of restart of the duplex printing after the print fault factor was eliminated is included in the output order management information changed by said page output order changing unit.

4. An information processing apparatus according to claim 1, further comprising an instructing unit adapted to instruct to clear the print data which has already been outputted by said first output unit and is stored in a memory provided for the printing apparatus, and
wherein said second output unit outputs the print data after the instruction was made by said instructing unit.

5. An information processing apparatus according to claim 1, further comprising a re-output unit adapted to restart the duplex printing based on the alternating sheet feed on the basis of the print data of the non-print page if it is determined that the apparatus is in the state where the media can be fed from the sheet feeding portion.

6. An information processing apparatus according to claim 1, wherein the print data is outputted by said first output unit to the printing apparatus in which only two media have been set, and when no-medium is detected by said first obtaining unit, said second output unit outputs the print data of the non-print page of the second medium whose one side has already been printed to the printing apparatus in order to change the print page order based on the alternating sheet feed.

7. An information processing apparatus according to claim 1, wherein the alternating sheet feed corresponds to the duplex printing using a staying portion in the printing apparatus and alternately executes the sheet feed from the sheet feeding portion and the sheet feed from the staying portion.

8. An information processing apparatus according to claim 1, wherein no-sheet or a small remaining toner amount is included in the print fault factor.

9. An information processing apparatus according to claim 1, wherein the print data which is outputted is data obtained by compressing bit map data.

10. A print control method in an information processing apparatus which can communicate with a printing apparatus which can execute an alternating sheet feed constructed in such a manner that in advance of printing of the other side of a first medium whose one side has already been printed, a second medium is fed from a sheet feeding portion, one side of the second medium is printed, a conveying operation for duplex printing of the first medium is executed in parallel with the printing of one side of the second medium, and after completion of the printing of one side of the second medium, the first medium to which the conveying operation for the duplex printing has been executed is fed, thereby executing the duplex printing, said method comprising:

outputting print data according to print page order based on the alternating sheet feed to the printing apparatus through an interface;

obtaining status information of the printing apparatus;

obtaining situation information of the printing based on the print data; and outputting the print data of a non-print page in the staying medium which has already been fed and whose one side has already been printed to the printing apparatus in order to change the print page order based on the alternating sheet feed when a print fault factor in a sheet feed of the new medium is detected on the basis of the status information obtained in said first obtaining step.

11. A method according to claim 10, further comprising changing output order management information of the print data to the printing apparatus on the basis of the status information obtained in said first obtaining step when the print fault factor is detected.

12. A method according to claim 11, wherein output order of the print data at the time of restart of the duplex printing after the print fault factor was eliminated is included in the output order management information changed in said output order changing step.

13. A method according to claim 10, further comprising instructing to clear the print data which has already been outputted in said first output step and is stored in a memory provided for said printing apparatus, and wherein in said second output step, the print data is outputted after the instruction was made in said instructing step.

14. A method according to claim 10, further comprising restarting the duplex printing based on the alternating sheet feed on the basis of the print data of the non-print page if it is determined that the apparatus is in the state where the media can be fed from the sheet feeding portion.

15. A method according to claim 10, wherein in said first output step, the print data is outputted to the printing apparatus in which only two media have been set, and when no-medium is detected in said first obtaining step, in said second output step, the print data of the non-print page of the second medium whose one side has already been printed is outputted to the printing apparatus in order to change the print page order based on the alternating sheet feed.

16. A method according to claim 10, wherein the alternating sheet feed corresponds to the duplex printing using a staying portion in the printing apparatus and alternately executes the sheet feed from the sheet feeding portion and the sheet feed from the staying portion.

17. A method according to claim 10, wherein no-sheet or a small remaining toner amount is included in the print fault factor.

18. A method according to claim 10, wherein the print data which is outputted is data obtained by compressing bit map data.

19. A computer program which has been stored on a computer-readable storage medium and which causes a computer to execute a print control method of controlling an information processing apparatus, wherein the information processing apparatus can communicate with a printing apparatus which can execute an alternating sheet feed constructed in such a manner that in advance of printing of the other side of a first medium whose one side has already been printed, a second medium is fed from a sheet feeding portion, one side of the second medium is printed, a conveying operation for duplex printing of the first medium is executed in parallel with the printing of one side of the second medium, and after completion of the printing of one side of the second medium, the first medium to which the conveying operation for the duplex printing has been executed is fed, thereby executing the duplex printing, the method comprising:

outputting print data according to print page order based on the alternating sheet feed to the printing apparatus through an interface;

obtaining status information of the printing apparatus;

obtaining situation information of the printing based on the print data; and outputting the print data of a non-print page in the staying medium which has already been fed and whose one side has already been printed to the printing apparatus in order to change the print page order based on the alternating sheet feed when a print fault factor in a sheet feed of the new medium is detected on the basis of the status information obtained in said first obtaining step.

20. A computer-readable storage medium which stores a computer program which causes a computer to execute a print control method controlling an information processing apparatus, wherein the information processing apparatus can communicate with a printing apparatus which can execute an alternating sheet feed constructed in such a manner that in advance of printing of the other side of a first medium whose one side has already been printed, a second medium is fed from a sheet feeding portion, one side of the second medium is printed, a conveying operation for duplex printing of the first medium is executed in parallel with the printing of one side of the second medium, and after completion of the printing of one side of the second medium, the first medium to which the conveying operation for the duplex printing has been executed is fed, thereby executing the duplex printing, the method comprising:

outputting print data according to print page order based on the alternating sheet feed to the printing apparatus through an interface;

obtaining status information of the printing apparatus;

obtaining situation information of the printing based on the print data; and outputting the print data of a non-print page in the staying medium which has already been fed and whose one side has already been printed to the printing apparatus in order to change the print page order based on the alternating sheet feed when a print fault factor in a sheet feed of the new medium is detected on the basis of the status information obtained in said first obtaining step.

* * * * *